(12) United States Patent
Kunihiro et al.

(10) Patent No.: US 9,399,464 B2
(45) Date of Patent: Jul. 26, 2016

(54) VEHICLE CRUISE CONTROL DEVICE

(75) Inventors: Yoji Kunihiro, Susono (JP); Takahiro Kojo, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/412,530

(22) PCT Filed: Jul. 6, 2012

(86) PCT No.: PCT/JP2012/067387
§ 371 (c)(1),
(2), (4) Date: Jan. 2, 2015

(87) PCT Pub. No.: WO2014/006759
PCT Pub. Date: Jan. 9, 2014

(65) Prior Publication Data
US 2015/0134204 A1    May 14, 2015

(51) Int. Cl.
*B60W 30/14* (2006.01)
*B62D 15/02* (2006.01)
*B60W 30/10* (2006.01)
*B60W 40/11* (2012.01)
*B60W 40/112* (2012.01)
*B60R 21/00* (2006.01)
*B60W 30/12* (2006.01)
*B62D 6/00* (2006.01)
*G01C 21/34* (2006.01)

(52) U.S. Cl.
CPC .............. *B60W 30/143* (2013.01); *B60R 21/00* (2013.01); *B60W 30/10* (2013.01); *B60W 30/12* (2013.01); *B60W 40/112* (2013.01); *B62D 6/002* (2013.01); *B62D 15/025* (2013.01); *G01C 21/34* (2013.01)

(58) Field of Classification Search
CPC ... B62D 15/025; B62D 6/002; B60W 40/112; B60W 30/143; B60W 30/10; B60W 30/12; B60R 21/00; G01C 21/34
See application file for complete search history.

(56) References Cited

U.S. PATENT DOCUMENTS

| | | | |
|---|---|---|---|
| 5,172,317 A | 12/1992 | Asanuma et al. | |
| 8,825,297 B2 * | 9/2014 | Tanimoto et al. | ............... 701/41 |
| 2002/0103597 A1 * | 8/2002 | Takayama et al. | ............ 701/200 |
| 2005/0137792 A1 * | 6/2005 | Tsuge | ........................... 701/209 |
| 2006/0184321 A1 * | 8/2006 | Kawakami et al. | ........... 701/209 |
| 2006/0217861 A1 | 9/2006 | Ihara et al. | |
| 2008/0208460 A1 | 8/2008 | Nakao et al. | |

(Continued)

FOREIGN PATENT DOCUMENTS

| | | |
|---|---|---|
| JP | 2-48705 A | 2/1990 |
| JP | 2002-8199 A | 1/2002 |

(Continued)

*Primary Examiner* — Rodney Butler
(74) *Attorney, Agent, or Firm* — Sughrue Mion, PLLC

(57) ABSTRACT

A vehicle cruise control device is provided that obtains a target trajectory of a vehicle based on white lines 102 and 104 as traveling route specification targets contained in information acquired by a device that acquires at least information in front of the vehicle, and performs traveling trajectory control so as to cause the vehicle to travel along the target trajectory. When the vehicle travels a particular area 110 where a traveling route branches into a plurality of traveling routes and a target trajectory cannot be obtained based on white lines, an interim target trajectory 116 is obtained for the particular area, based on the white lines 102 and 104 in an area adjacent to the particular area and a traveling route that the vehicle is to travel after traveling the particular area, and interim traveling trajectory control is executed so that the vehicle travels along the interim target trajectory.

20 Claims, 28 Drawing Sheets

(56) References Cited

U.S. PATENT DOCUMENTS

| | | | |
|---|---|---|---|
| 2008/0243351 A1* | 10/2008 | Isogai et al. | 701/96 |
| 2009/0082967 A1* | 3/2009 | Hara et al. | 701/225 |
| 2009/0187340 A1* | 7/2009 | Vavrus | G01C 21/20 701/414 |
| 2010/0168998 A1 | 7/2010 | Matsunaga | |
| 2011/0010021 A1 | 1/2011 | Kobayashi | |
| 2012/0226392 A1 | 9/2012 | Kataoka | |

FOREIGN PATENT DOCUMENTS

| | | | |
|---|---|---|---|
| JP | 2006-264624 A | | 10/2006 |
| JP | 2006-273230 A | | 10/2006 |
| JP | 2006-344133 A | | 12/2006 |
| JP | 2007170927 A | * | 7/2007 |
| JP | 2007255913 A | * | 10/2007 |
| JP | 2007-313978 A | | 12/2007 |
| JP | 2008-197905 A | | 8/2008 |
| JP | 2009-12672 A | | 1/2009 |
| JP | 2009-85613 A | | 4/2009 |
| JP | 2009-214786 A | | 9/2009 |
| JP | 2010-19628 A | | 1/2010 |
| JP | 2010-155547 A | | 7/2010 |
| WO | WO 2011048688 A1 | * | 4/2011 |
| WO | 2011064825 A1 | | 6/2011 |

* cited by examiner

VEHICLE CRUISE CONTROL DEVICE

CROSS REFERENCE TO RELATED APPLICATIONS

This application is a National Stage of International Application No. PCT/JP2012/067387 filed Jul. 6, 2012, the contents of which are incorporated herein by reference in their entirety.

TECHNICAL FIELD

The present invention relates to a vehicle cruise control device, and more specifically relates to a vehicle cruise control device that causes a vehicle to travel along a target trajectory (target traveling line) by controlling a rudder angle of steered wheels.

BACKGROUND ART

As a vehicle cruise control device for automobiles and the like, the following have been known: a traveling trajectory control device that controls a traveling trajectory so that a vehicle should travel along a target trajectory; and a lane keeping device that causes a driver to recognize a lateral dislocation amount of a vehicle with respect to a lane so as to prevent the vehicle from deviating from the lane. JP 2006-264624A, for example, discloses one example of the latter, that is, a lane keeping device.

SUMMARY OF INVENTION

Problem to be Solved by the Invention

In a cruise control device as mentioned above, information about a situation in front of the vehicle is acquired by an image pickup device such as a CCD camera, a traveling route ahead of the vehicle is specified based on the acquired image information, and a lane that the vehicle should travel, a target trajectory of the vehicle, and the like are set based on the specified traveling route. In this case, the traveling route is specified by electronically processing the acquired image information so as to determine traveling route specification targets such as white lines, guardrails, medians, and road shoulders.

A so-called branch point area, where a traveling route is branched into a plurality of traveling routes, for example, a crossing, a Y-intersection, a T-intersection, or the like, however, has an area that does not have traveling route specification targets such as white lines with which boundaries of a traveling route can be determined. In such an area, it is impossible to specify a traveling route based on a traveling route specification target, and therefore, a cruise control device is unable to continue cruise control based on traveling route specification targets.

The present invention has been made in light of the above-described problem of a conventional cruise control device, and it is a principal object of the present invention to provide a cruise control device that is improved so as to continue cruise control of a vehicle even when the vehicle travels in a branch point area of a traveling route.

Means to Solve the Problem, and Effect of the Invention

According to the present invention, the principal problem mentioned above is solved by a vehicle cruise control device that includes: an external world information acquisition unit configured to acquire at least information about a situation in front of the vehicle; and a control unit configured to obtain a target trajectory of a vehicle based on a traveling route specification target included in information acquired by the external world information acquisition unit, and perform traveling trajectory control so as to cause the vehicle to travel along the target trajectory, wherein an area where a traveling route branches into a plurality of traveling routes and a target trajectory cannot be obtained based on the traveling route specification target is assumed to be a particular area, and wherein, when the vehicle travels the particular area, the control unit obtains an interim target trajectory for the particular area based on a traveling route specification target in an area adjacent to the particular area and a traveling route that the vehicle is to travel after traveling the particular area, and executes interim traveling trajectory control so that the vehicle travels along the interim target trajectory.

According to the above-described configuration, when a vehicle travels a particular area, an interim target trajectory for the particular area is obtained based on a traveling route specification target in an area adjacent to the particular area, and a traveling route that the vehicle is to travel after traveling the particular area. Then, interim traveling trajectory control is performed so that the vehicle is to travel along an interim target trajectory. This allows vehicle cruise control to be continued by interim traveling trajectory control, even when the vehicle travels the particular area.

Further, according to the present invention, the above-described configuration may be modified so that, when a traveling route that the vehicle is to travel has been already selected from the plurality of traveling routes, the control unit sets a virtual traveling route specification target based on the traveling route specification target in the area adjacent to the particular area and the selected traveling route, and obtains the interim target trajectory based on the virtual traveling route specification target.

According to the above-described configuration, when a traveling route that the vehicle is to travel has already been selected from a plurality of traveling routes, a virtual traveling route specification target is set based on a traveling route specification target in the area adjacent to the particular area and the selected traveling route. Then, an interim target trajectory is obtained based on a virtual traveling route specification target. Therefore, when a traveling route that the vehicle is to travel has already been selected, an interim target trajectory in the particular area can be obtained so that the vehicle can travel the selected traveling route.

Further, according to the present invention, the above-described configuration may be modified so that, when a traveling route that the vehicle is to travel has not been selected yet from the plurality of traveling routes, the control unit estimates a traveling route that the vehicle is to travel from the plurality of traveling routes based on a driving situation of the vehicle and a driver's driving operation, sets a virtual traveling route specification target based on the traveling route specification target in the area adjacent to the particular area and the estimated traveling route, and obtains the interim target trajectory based on the virtual traveling route specification target.

According to the above-described configuration, in the case where a traveling route that the vehicle is to travel has not been selected yet from a plurality of traveling routes, the traveling route that the vehicle is to travel is estimated from the plurality of traveling routes, based on a driving situation of the vehicle and a driver's driving operation. Further, a virtual traveling route specification target is set based on a traveling route specification target in an area adjacent to a particular area and the estimated traveling route, an interim target trajectory is obtained based on the virtual traveling route specification target. Therefore, in the case where a traveling route that the vehicle is to travel has not been selected yet, an interim target trajectory in a particular area can be obtained based on a driving situation of the vehicle and the driver's driving operation.

Further, according to the present invention, the above-described configuration may be modified so that the control unit determines a vehicle travelable range in the particular area based on the virtual traveling route specification target, and obtains the interim target trajectory based on a position of the vehicle under the execution of the traveling trajectory control and the travelable range.

According to the above-described configuration, a vehicle travelable range in the particular area is determined based on a virtual traveling route specification target, and an interim target trajectory is obtained based on the position of the vehicle under the execution of the traveling trajectory control and the travelable range. Therefore, the interim target trajectory can be obtained based on the position of the vehicle under the execution of traveling trajectory control and the travelable range, which makes it possible to obtain an interim target trajectory appropriately, as compared with the case where the position of the vehicle under the execution of traveling trajectory control or the travelable range are not taken into consideration.

Further, according to the present invention, the above-described configuration may be modified so that the cruise control device further includes a map information acquisition unit configured to acquire map information about the particular area, and is configured so that the control unit sets the virtual traveling route specification target based on the map information acquired by the map information acquisition unit.

According to the above-described configuration, a virtual traveling route specification target is set based on map information acquired by the map information acquisition unit. Therefore, even with respect to a range from which information cannot be acquired in the case where the external world information acquisition unit is an image pickup device, a virtual traveling route specification target can be set, which makes it possible to further surely obtain an interim target trajectory for the particular area.

Further, according to the present invention, the above-described configuration may be modified so that, when the vehicle has to turn in the particular area, the control unit estimates a minimum turning radius and a maximum turning radius of a body of the vehicle based on a radius of the interim target trajectory; and when the minimum turning radius or the maximum turning radius is not within the vehicle travelable range, the control unit sets an interim target trajectory anew so that the minimum turning radius and the maximum turning radius fall in the vehicle travelable range.

According to the above-described configuration, a minimum turning radius and a maximum turning radius of a vehicle body is estimated based on a radius of the interim target trajectory, and when any one of the turning radii is not within the vehicle travelable range, an interim target trajectory is set anew so that both of the turning radii fall in the vehicle travelable range. Therefore, an interim target trajectory can be set anew as required so that the vehicle body turns within the vehicle travelable range.

Further according to the present invention, the above-described configuration may be modified so that the control unit uses, as the interim target trajectory, such a trajectory that at least one of a magnitude of a turning lateral acceleration of the vehicle and a magnitude of a rate of change in the turning lateral acceleration is minimized, among trajectories that pass through the vehicle travelable range.

According to the above-described configuration, among trajectories that pass throught the vehicle travelable range, such a trajectory that at least one of a magnitude of a turning lateral acceleration of the vehicle and a magnitude of the rate of change in the same is minimized is used as the interim target trajectory. Therefore, an interim target trajectory that passes through the vehicle travelable range and that allows at least one of a magnitude of a turning lateral acceleration of the vehicle and a magnitude of the rate of change in the same is minimized can be obtained, which makes it possible to prevent riding comfort of the vehicle from being impaired.

Further, according to the present invention, the above-described configuration may be modified so that the control unit modifies the interim target trajectory within the vehicle travelable range based on a driver's driving operation after start of the interim traveling trajectory control.

According to the above-described configuration, the interim target trajectory is modified within the vehicle travelable range based on a driver's driving operation after start of interim traveling trajectory control. Therefore, in the case where a driving operation is performed by a driver, the interim target trajectory can be modified so that the driver's intention should be reflected.

Further, according to the present invention, the above-described configuration may be modified so that, when a situation in which a magnitude of a driver's driving operation amount after start of the interim traveling trajectory control is equal to or more than a reference value for target trajectory change continues for a period of time equal to or longer than a reference period of time for target trajectory change, the control unit changes the traveling route that the vehicle is to travel based on the driver's driving operation, and obtains an interim target trajectory anew based on the traveling route specification target in the area adjacent to the particular area and the changed traveling route.

According to the above-described configuration, in the case where a situation in which a magnitude of a driver's driving operation amount after start of the interim traveling trajectory control is equal to or more than a reference value for target trajectory change continues for a period of time equal to or longer than a reference period of time for target trajectory change, the traveling route that the vehicle is to travel is changed based on the driver's driving operation. Then, an interim target trajectory is obtained anew based on the traveling route specification target in the area adjacent to the particular area and the changed traveling route. Therefore, as is the case where a driver intends to change the course, if the interim target trajectory is different from the course intended by the driver, the interim target trajectory can be obtained anew according to the driver's intention.

Further, according to the present invention, the above-described configuration may be modified so that, in the interim traveling trajectory control, the control unit calculates an interim target rudder angle of a steered wheel for causing a trajectory of the vehicle to coincide with the interim target trajectory by at least one of feedback control and feedforward control, and controls the rudder angle of the steered wheel based on the interim target rudder angle.

According to the above-described configuration, an interim target rudder angle of a steered wheel for causing a trajectory of the vehicle to coincide with the interim target trajectory is calculated by at least one of feedback control and feedforward control, and the rudder angle of the steered wheel is controlled based on the interim target rudder angle. Therefore, the rudder angle of the steered wheel can be controlled so that the vehicle travels along the interim target trajectory.

Further, according to the present invention, the above-described configuration may be modified so that the control unit causes cruise control to make gradual transition from traveling trajectory control to interim traveling trajectory control before the vehicle enters the particular area.

According to the above-described configuration, cruise control is coused to make gradual transition from traveling trajectory control to interim traveling trajectory control before the vehicle enters the particular area. Therefore, as compared with the case where cruise control makes transition from traveling trajectory control to interim traveling trajectory control when the vehicle enters the particular area, a risk that control transition causes the behavior of the vehicle to suddenly change, or causes an occupant to feel discomfort, can be reduced more surely.

Further, according to the present invention, the above-described configuration may be modified so that the control unit causes cruise control to make gradual transition from interim traveling trajectory control to traveling trajectory control after the vehicle finishes traveling in the particular area.

According to the above-described configuration, cruise control is caused to make gradual transition from interim traveling trajectory control to traveling trajectory control after the vehicle finishes traveling in the particular area. Therefore, as compared with the case where cruise control makes transition from interim traveling trajectory control to traveling trajectory control when the vehicle finishes traveling in the particular area, a risk that control transition causes the behavior of the vehicle to suddenly change, or causes an occupant to feel discomfort, can be reduced more surely.

Further, according to the present invention, in the above-described configuration, the particular area may be any one of a crossing, a T-intersection, and a branched road.

According to the above-described configuration, since the particular area is any one of a crossing, a T-intersection, and a branched road, when the vehicle travels these, interim traveling trajectory control can be executed surely, so that the cruise control can be continued.

Preferred Aspect of Means for Solving Problem

According to one preferred aspect of the present invention, the configuration may be such that a vehicle includes a rudder angle varying device configured to change the relationship between an operation position of a steering input unit and a rudder angle of a steered wheel, and controls the rudder angle of the steered wheel by controlling the rudder angle varying device.

According to another preferred aspect of the present invention, the configuration may be such that the vehicle includes a navigation device, wherein a traveling route that the vehicle is to travel is selected according to a traveling route set by the navigation device.

According to still another preferred aspect of the present invention, the case where a traveling route that the vehicle is to travel has not been selected yet may include a case where the vehicle does not include a navigation device, and a case where the vehicle includes a navigation device but a traveling route is not set by the navigation device.

According to still another preferred aspect of the present invention, the configuration may be such that a vehicle travelable range in a particular area is determined by setting margins on both sides of a traveling route determined based on a virtual traveling route specification target.

According to still another preferred aspect of the present invention, the configuration may be such that interim target trajectory is modified when a situation in which a magnitude of a driver's driving operation amount after start of interim traveling trajectory control is equal to or more than a reference value for target trajectory modification continues for a period of time equal to or longer than a reference period of time for target trajectory modification.

According to still another preferred aspect of the present invention, the configuration may be such that the target trajectory is caused to make gradual transition from a normal target trajectory to an interim target trajectory, so that cruise control is caused to make gradual transition from traveling trajectory control to interim traveling trajectory control.

According to still another preferred aspect of the present invention, the configuration may be such that target trajectory is caused to make gradual transition from interim target trajectory to normal target trajectory, so that cruise control is caused to make gradual transition from interim traveling trajectory control to traveling trajectory control.

DESCRIPTION OF EMBODIMENTS

The following explains several preferable embodiments of the present invention in details while referring to attached drawings. Each embodiment described below is an embodiment applied to a vehicle keeping to the left, but the present invention may be applied to a vehicle keeping to the right.

First Embodiment

Figure 1:
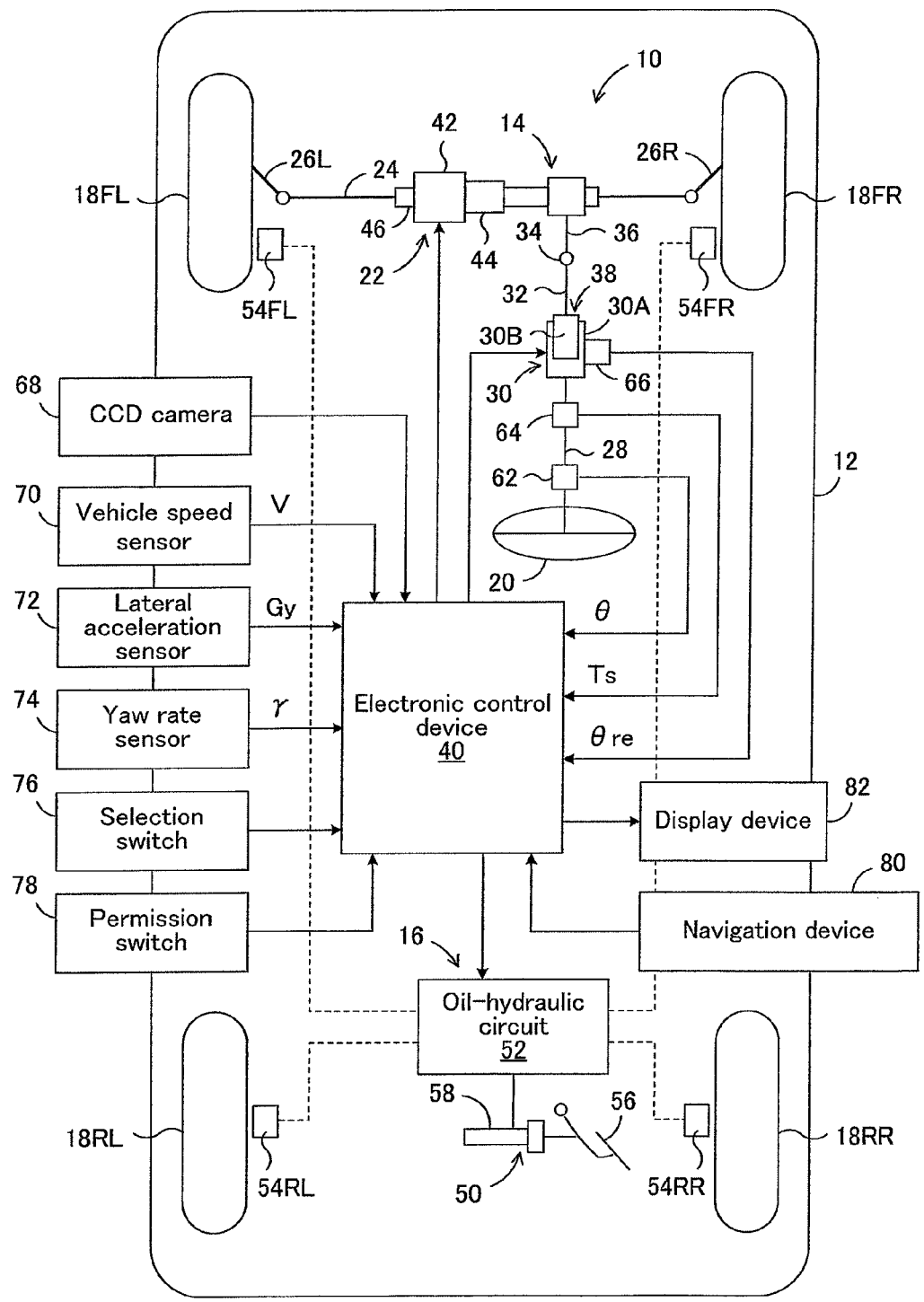
FIG. 1 illustrates a schematic configuration in First Embodiment of a vehicle cruise control device according to the present invention that is applied in a navigation device installed vehicle and that is configured as a traveling trajectory control device.

FIG. 1 illustrates a schematic configuration in First Embodiment of a vehicle cruise control device according to the present invention that is applied in a navigation device installed vehicle and that is configured as a traveling trajectory control device.

In FIG. 1, "10" indicates a traveling trajectory control device mounted on a vehicle 12, and the traveling trajectory control device 10 includes a front wheel steering control device 14. The front wheel steering control device 14 constitutes a steering control means that is capable of steering front wheels independently of a driver's steering operation. Further, a braking force control device 16 is mounted on the vehicle 12, and the braking force control device 16 is capable of individually controlling a braking force of each wheel independently of the driver's braking operation.

Further, in FIG. 1, "18FL" and "18FR" indicate left and right front wheels that are steered wheels of the vehicle 12, respectively, and "18RL" and "18RR" indicate left and right rear wheels, respectively. The left and right front wheels 18FL and 18FR, which are steeed wheels, are turned by a rack-and-pinion-type power steering device 22 driven in response to an operation of a steering wheel 20 by the driver, via a rack bar 24 and tie rods 26L and 26R.

The steering wheel 20 is connected to a pinion shaft 36 of the power steering device 22 via an upper steering shaft 28, a rudder angle varying device 30, a lower steering shaft 32, and a universal joint 34 so that the steering wheel 20 is driven. In First Embodiment illustrated in the drawing, the rudder angle varying device 30 includes a motor 38 for auxiliary turning drive that is linked to a lower end of the upper steering shaft 28 on a housing 30A side, and linked to an upper end of the lower steering shaft 32 on a rotor 30B side.

Thus, the rudder angle varying device 30 rotates the lower steering shaft 32 relatively with respect to the upper steering shaft 28, thereby performing auxiliary turning drive of the left and right front wheels 18FL and 18FR relatively with respect to the steering wheel 20. The rudder angle varying device 30 is controlled by a steering control unit of an electronic control device 40.

The power steering device 22 is a rack-coaxial-type electric power steering device, and includes a motor 42, and, for example, a ball-screw-type conversion mechanism 44 for converting a rotation torque of the motor 42 into power in a direction of a reciprocating movement of the rack bar 24. The power steering device 22 is controlled by a steering assist torque control unit of the electronic control device 40, so as to generate a steering assist torque that drives the rack bar 24 relatively with respect to a housing 46. The steering assist torque reduces steering loads on the driver, and assists the rudder angle varying device 30 to turn the left and right front wheels as required.

Thus, the rudder angle varying device 30 constitutes a principal member of the front wheel steering control device 14 that changes the relationship of the rudder angle of the left and right front wheels with respect to the steering wheel 20 in cooperation with the power steering device 22, and that steers the front wheels independently of the driver's steering operation.

The mechanics of the power steering device 22 and the rudder angle varying device 30 themselves, however, are not the essences of the present invention, and these devices may have any arbitrary configurations known in the technical fields thereof, as long as they function as mentioned above.

The braking force control device 16 includes a braking device 50, and braking forces for the wheels are controlled by controlling respective pressures Pi (i=fl, fr, rl, rr) in wheel cylinders 54FL, 54FR, 54RL, and 54RR, that is, brake pressures, by an oil-hydraulic circuit 52 of the braking device 50. Though not illustrated in FIG. 1, the oil-hydraulic circuit 52 includes an oil reservoir, an oil pump, various valve devices, and the like, and in a normal situation, the brake pressure of each wheel cylinder is controlled by a master cylinder 58 that is driven in response to an operation by the driver of stepping on the brake pedal 56. Further, the brake pressure for each wheel cylinder is individually controlled by the oil-hydraulic circuit 52 controlled by the braking force control unit of the electronic control device 40 as required. Thus, the braking device 50 is capable of individually controlling the braking force of each wheel independently of the driver's braking operation, and functions as a principal device of the braking force control device 16.

The upper steering shaft 28 is provided with a steering angle sensor 62 that detects a rotation angle of the shaft as a steering angle θ, and a steering torque sensor 64 that detects a steering torque Ts. Signals indicating the steering angle θ and the steering torque Ts are fed to the electronic control device 40. Further, to the electronic control device 40, a signal is fed that indicates a relative rotation angle θre of the rudder angle varying device 30 detected by a rotation angle sensor 66, that is, a relative rotation angle of the lower steering shaft 32 with respect to the upper steering shaft 28.

According to the embodiment illustrated in the drawing, a CCD camera 68 for picking a forward image of the vehicle 12 is provided in the upper front of the interior of the vehicle 12, and a signal indicating a forward image information of the vehicle 12 is fed from the CCD camera 68 to the electronic control device 40. To the electronic control device 40, the following signals are fed as well: a signal that indicates a vehicle speed V detected by a vehicle speed sensor 70; a signal that indicates a vehicle lateral acceleration Gy detected by a lateral acceleration sensor 72; and a signal that indicates a vehicle yaw rate γ detected by a yaw rate sensor 74. In addition, the steering angle sensor 62, the steering torque sensor 64, and the rotation angle sensor 66 detect a steering angle θ, a steering torque Ts, and a relative rotation angle θre, respectively, which have positive values in the case where the vehicle is steered or turned in the left turn direction.

The vehicle 12 is provided with a selection switch 76 for selection regarding whether traveling trajectory control, which is also called "lane keeping assist control" (LKA control), should be performed, and a permission switch 78 for selection regarding whether interim traveling trajectory control should be permitted. Signals indicating the settings of the selection switch 76 and the permission switch 78 are also fed to the electronic control device 40. Further, on the vehicle 12, a navigation device 80 is mounted, and the electronic control device 40 transfers/receives necessary information to/from the navigation device 80.

Further, signals indicating a master cylinder pressure Pm detected by a pressure sensor (not illustrated in FIG. 1) and other signals are fed to the electronic control device 40, and the electronic control device 40 displays information necessary for vehicle occupants, such as situations of traveling trajectory control, on a display device 82. The display device 82 may be a part of a monitor of the navigation device 80, or alternatively, another display device different from the monitor of the navigation device 80.

Each of above-described control units of the electronic control device 40 may includes a CPU, a ROM, a RAM, and an input/output port device, and these may include microcomputers that are connected with one another by bidirectional common buses. In particular, the ROM stores programs and maps for traveling trajectory control, which are described below, and a plurality of maps that are different from one another regarding angles formed between roads, and the number of lanes, for each type of the branch points such as a crossing, a Y-intersection, a T-intersection, and the like.

Figure 2:
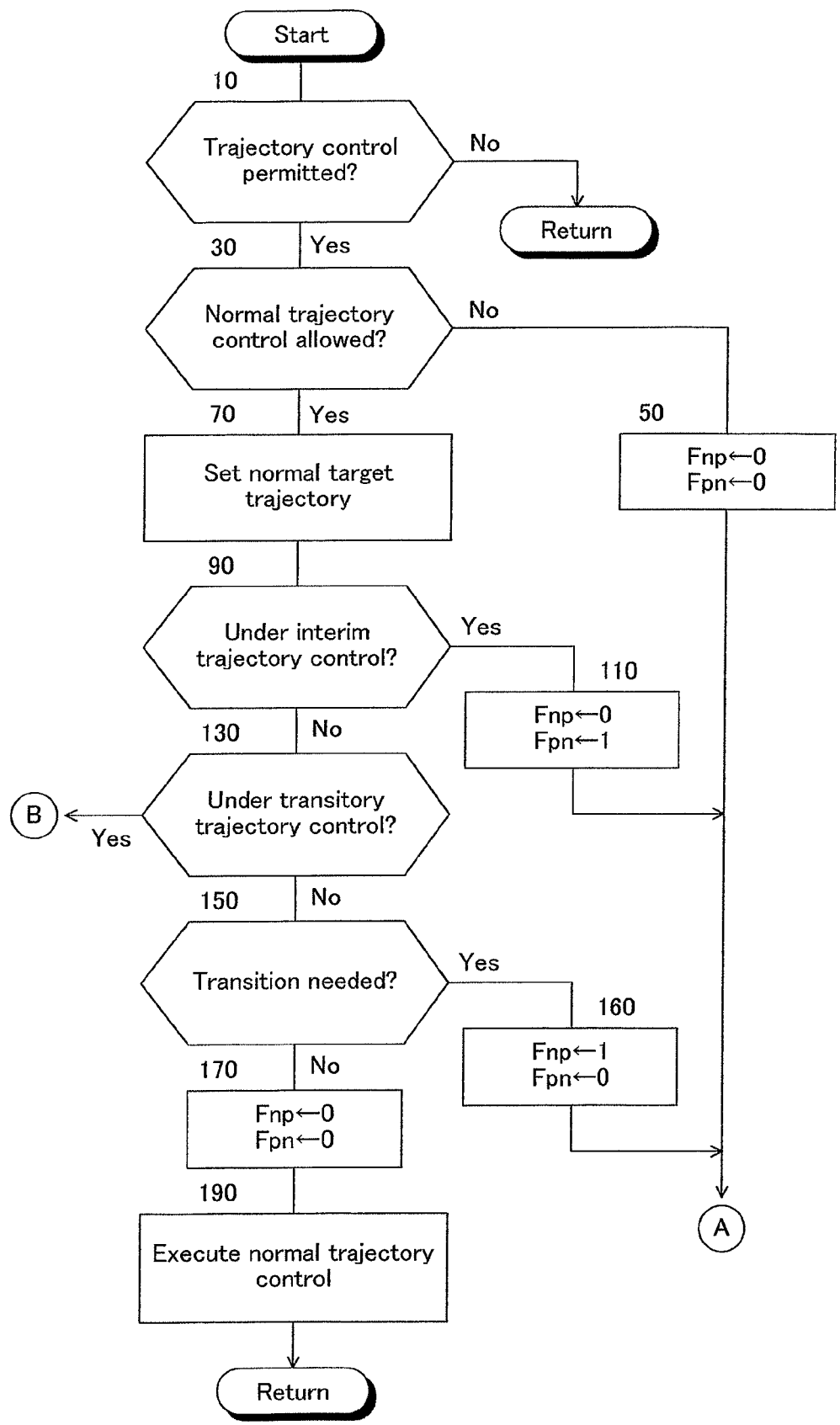
FIG. 2 is a general flowchart illustrating a first half of a traveling trajectory control routine in First Embodiment.
Figure 3:
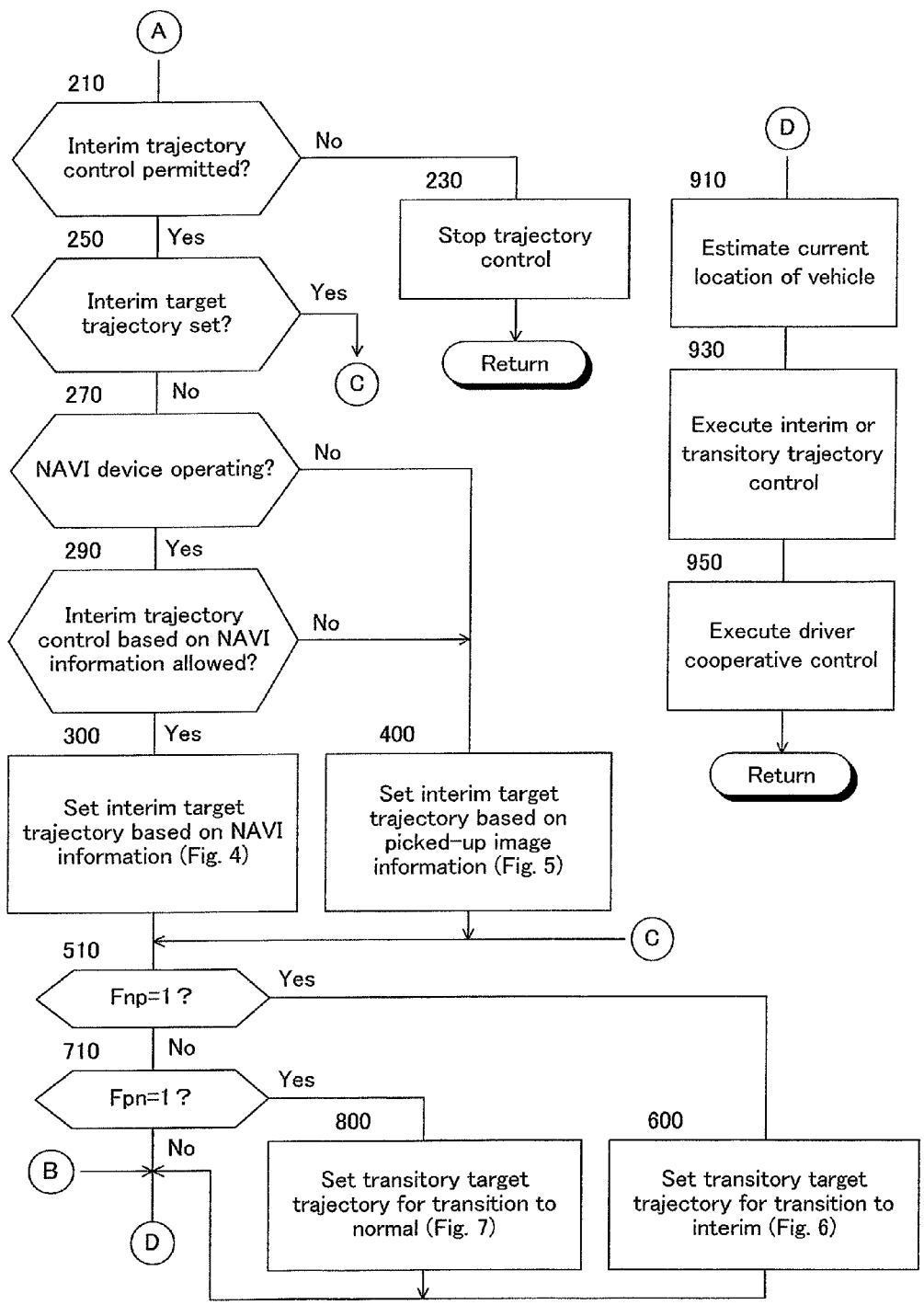
FIG. 3 is a general flowchart illustrating a last half of the traveling trajectory control routine in First Embodiment.

The steering control unit of the electronic control device 40 performs traveling trajectory control in accordance with flowcharts illustrated in FIGS. 2 and 3. In particular, the steering control unit calculates a target rudder angle δt of the left and right front wheels for performing normal trajectory control, when the selection switch 76 is ON and normal traveling trajectory control can be performed. In other words, the steering control unit specifies a traveling route based on forward image information of the vehicle 12 acquired by the CCD camera 68. Then, the steering control unit calculates a normal target rudder angle δtn of the left and right front wheels for causing the vehicle 12 to travel along a target trajectory based on the specified traveling route, thereby obtaining a target rudder angle δt for trajectory control.

Further, the steering control unit of the electronic control device 40 performs interim trajectory control, as is explained in detail below, when the selection switch 76 is ON but the vehicle is traveling in a particular area, while normal trajectory control for causing the vehicle to travel along the normal target trajectory cannot be performed. In other words, the steering control unit sets an interim target trajectory for allowing the vehicle to travel a particular area, and calculates an interim target rudder angle δtp of the left and right front wheels for causing the vehicle to travel along the interim target trajectory, thereby obtaining a target rudder angle δt of trajectory control.

It should be noted that in the present description, the "particular area" refers to an area of a so-called branch point where a traveling route branches into a plurality of traveling routes and a target trajectory cannot be obtained based on a traveling route specification target such as a white line. More specifically, a "particular area" refers to a crossing, a Y-intersection, or a T-intersection, and a "traveling route specification target" refers to a target for determination of a boundary of a traveling route with which the traveling route can be specified, such as a white line, a guardrail, a median, and a road shoulder. Further, the "interim target trajectory" refers to a target trajectory that is set in a particular area so that a vehicle can travel a traveling route that the vehicle is to travel after traveling the particular area.

Further, the steering control unit of the electronic control device 40 gradually varies a target trajectory so that, when the target trajectory is switched between the normal target trajectory and the interim target trajectory, the rudder angle of the left and right front wheels should not change rapidly. In other words, the steering control unit obtains a transitory target trajectory for gradually varying a target trajectory so that a position of the target trajectory in the width direction of the traveling route or an orientation of the target trajectory should not change rapidly when the target trajectory is switched, and thus, performs transitory trajectory control based on the transitory target trajectory.

In particular, in a situation in which normal trajectory control can be performed, when the steering control unit determines that it is necessary to thereafter switch the target trajectory from the normal target trajectory to an interim target trajectory, the steering control unit, at this stage, starts transitory trajectory control for making gradual transition from the normal target trajectory to the interim target trajectory. In contrast, when the target trajectory is switched from an interim target trajectory to a normal target trajectory, the steering control unit starts transitory trajectory control for making gradual transition from the interim target trajectory to the normal target trajectory, at a stage where normal trajectory control can be performed.

Further, the steering control unit of the electronic control device 40 calculates a target pinion angle θpt corresponding to a target rudder angle δt of the left and right front wheels of the vehicle 12, and controls the rudder angle varying device 30 so that the angle of a pinion 36 becomes identical to the target pinion angle θpt.

It should be noted that as the calculation itself of the target rudder angle δt for causing a vehicle to travel along a target trajectory is not the essence of the present invention, the calculation may be performed in any arbitrary manner, whichever the target trajectory is, a normal target trajectory, an interim target trajectory, or a transitory target trajectory. As is explained in details below, however, it is preferable that a lateral deviation of a vehicle with respect to a target trajectory and a yaw angle of the vehicle, as well as a radius of the target trajectory are estimated, and that based on the estimated parameters, a target rudder angle of the steered wheels is calculated.

<General Flow of Traveling Trajectory Control>

Next, the following explains a traveling trajectory control routine in First Embodiment, while referring to the general flowcharts illustrated in FIGS. 2 and 3. The control according to the flowcharts illustrated in FIGS. 2 and 3 is started when an ignition switch (not illustrated in the drawings) is closed, and executed repeatedly at each predetermined time. Further, in the drawings referred to in the following description, the navigation device is abbreviated and referred to as a "NAVI device" and navigation information from the navigation device is abbreviated and referred to as "NAVI information" as required.

First of all, in step 10, whether the selection switch 76 is ON and trajectory control is permitted is determined. Then, when the result of the determination is affirmative, the control proceeds to step 30, and when the result of the determination is negative, the control according to the flowchart illustrated in FIG. 2 is ended. It should be noted that when the rudder angle of the left and right front wheels is being controlled by normal trajectory control, transitory trajectory control, or interim trajectory control, the control is stopped.

In step 30, whether a vehicle is not traveling a particular area and normal trajectory control can be executed by obtaining a target trajectory based on a traveling route specification target such as a white line is determined. Then, when the result of the determination is affirmative, the control proceeds to step 70, and when the result of the determination is negative, the control proceeds to step 50.

In step 50, a flag Fnp relating to whether transition is being made from normal trajectory control to interim trajectory control and a flag Fpn relating to whether transition is being made from interim trajectory control to normal trajectory control are reset to 0, and thereafter, the control proceeds to step 210.

In step 70, a traveling route is specified based on forward image information of the vehicle 12 acquired by the CCD camera 68, and a target trajectory for normal trajectory control is set based on the specified traveling route.

In step 90, whether interim trajectory control is executed is determined. Then, when the result of the determination is negative, the control proceeds to step 130, and when the result of the determination is affirmative, the flag Fnp is reset to 0 and the flag Fpn is set to 1 in step 110. Thereafter, the control proceeds to step 210.

In step 130, by determination of whether the flag Fnp or the flag Fpn is 1, whether transitory trajectory control, which is described below, is being executed is determined. Then, when the result of the determination is affirmative, the control proceeds to step 910, and when the result of the determination is negative, the control proceeds to step 150.

In step 150, it is determined whether a particular area exists in an area where the vehicle will reach after a preliminarily set period of time elapses from the present time, or in an area a preliminarily set distance ahead from the current location; that is, it is determined whether transition from normal trajectory control to interim trajectory control is necessary. Then, when the result of the determination is affirmative, the flag Fnp is set to 1 and the flag Fpn is reset to 0 in step 160. Thereafter, the control proceeds to step 210. In contrast, when the result of the determination is negative, the flags Fnp and Fpn are reset to 0 in step 170, and thereafter, the control proceeds to step 190.

It should be noted that when the navigation device 80 is in operation, whether a particular area exists may be determined based on information from the navigation device 80. Further, when the navigation device 80 is not in operation, whether a particular area exists may be determined based on forward image information of the vehicle 12 acquired by the CCD camera 68. Still further, the preliminarily set time or the preliminarily set distance may be constant, or alternatively, the same may be variably set according to the vehicle speed, in order that the higher the vehicle speed V is, the longer the time or the distance is, so that the target trajectory can be surely switched between a normal target trajectory and an interim target trajectory.

In step 190, a normal target rudder angle δtn of the left and right front wheels for causing the vehicle to travel along the normal target trajectory set in step 70 mentioned above is calculated, and the rudder angle varying device 30 is controlled so that the rudder angle of the left and right front wheels becomes identical to the target rudder angle δtn. Normal trajectory control, however, is not the essence of the present invention, and may be executed by any arbitrary manner. Therefore, more descriptions are omitted about normal trajectory control, but it is preferable that normal trajectory control should be carried out in the same manner as that for interim trajectory control and the like.

In step 210, whether the permission switch 78 is ON and interim trajectory control is permitted is determined. Then, when the result of the determination is affirmative, the control proceeds to step 250, and when the result of the determination is negative, the control proceeds to step 230.

In step 230, the trajectory control is ended, and the control returns to step 10. When the flag Fnp is 1, however, the control proceeds to step 190 until the flag Fnp becomes 0, and normal trajectory control is continued.

In step 250, whether an interim target trajectory has already been set is determined. When the result of the determination is affirmative, the control proceeds to step 510, and when the result of the determination is negative, the control proceeds to step 270.

In step 270, whether the navigation device 80 is in operation is determined. When the result of the determination is negative, the control proceeds to step 400, and when the result of the determination is affirmative, the control proceeds to step 290.

In step 290, it is determined whether interim trajectory control based on navigation information from the navigation device 80 can be carried out. When the result of the determination is negative, the control proceeds to step 400, and when the result of the determination is affirmative, the control proceeds to step 300. In the case where, for example, a destination is set by the navigation device 80 and therefore a target traveling route is set, the result of the determination is affirmative.

In step 300, as is explained in details below, in accordance with a flowchart illustrated in FIG. 4, an interim target trajectory is set based on the navigation information from the navigation device 80.

In step 400, as is explained in details below, in accordance with a flowchart illustrated in FIG. 5, an interim target trajectory is set based on forward image information of the vehicle 12 acquired by the CCD camera 68.

In step 510, whether the flag Fnp is 1 is determined, that is, whether transition is being made from normal trajectory control to interim trajectory control is determined. Then, when the result of the determination is affirmative, the control proceeds to step 600, and when the result of the determination is negative, the control proceeds to step 710.

In step 600, in order that transition from normal trajectory control to interim trajectory control is smoothly carried out, as is explained in details below, a transitory target trajectory for transition from normal trajectory control to interim trajectory control is set in accordance with a flowchart illustrated in FIG. 6. When step 600 is finished, the control proceeds to step 910.

In step 710, whether the flag Fpn is 1 is determined, that is, whether transition is being made from interim trajectory control to normal trajectory control is determined. Then, when the result of the determination is negative, the control proceeds to step 910, and when the result of the determination is affirmative, the control proceeds to step 800.

In step 800, in order that transition from interim trajectory control to normal trajectory control is smoothly carried out, as is explained in details below, a transitory target trajectory for transition from interim trajectory control to normal trajectory control is set in accordance with a flowchart illustrated in FIG. 7. When step 800 ends, the control proceeds to step 910.

In step 910, as is explained in details below, a current location of the vehicle is estimated based on wheel speeds Vfl, Vfr of the left and right front wheels 18FL, 18FR, wheel speeds Vrl, Vrr of the left and right rear wheels 18RL, 18RR, and a rudder angle δ of the left and right front wheels.

In step 930, a target rudder angle δt of the left and right front wheels for causing the vehicle to travel along the interim target trajectory set in step 300 or 400, or along a transitory target trajectory set in step 600 or 800, is calculated. Then, in the same manner as that for the case of normal trajectory control, the rudder angle varying device 30 is controlled so that the rudder angle δ of the left and right front wheels becomes identical to the target rudder angle δt, whereby interim trajectory control or transitory trajectory control is executed.

In step 950, as is explained in details below, a normal target trajectory, a transitory trajectory control, or an interim target trajectory is corrected or changed as required according to the driver's steering operation, so that the traveling route of the vehicle reflects the driver's intention.

<Interim Target Trajectory Setting Based on Navigation Information>

Figure 4:
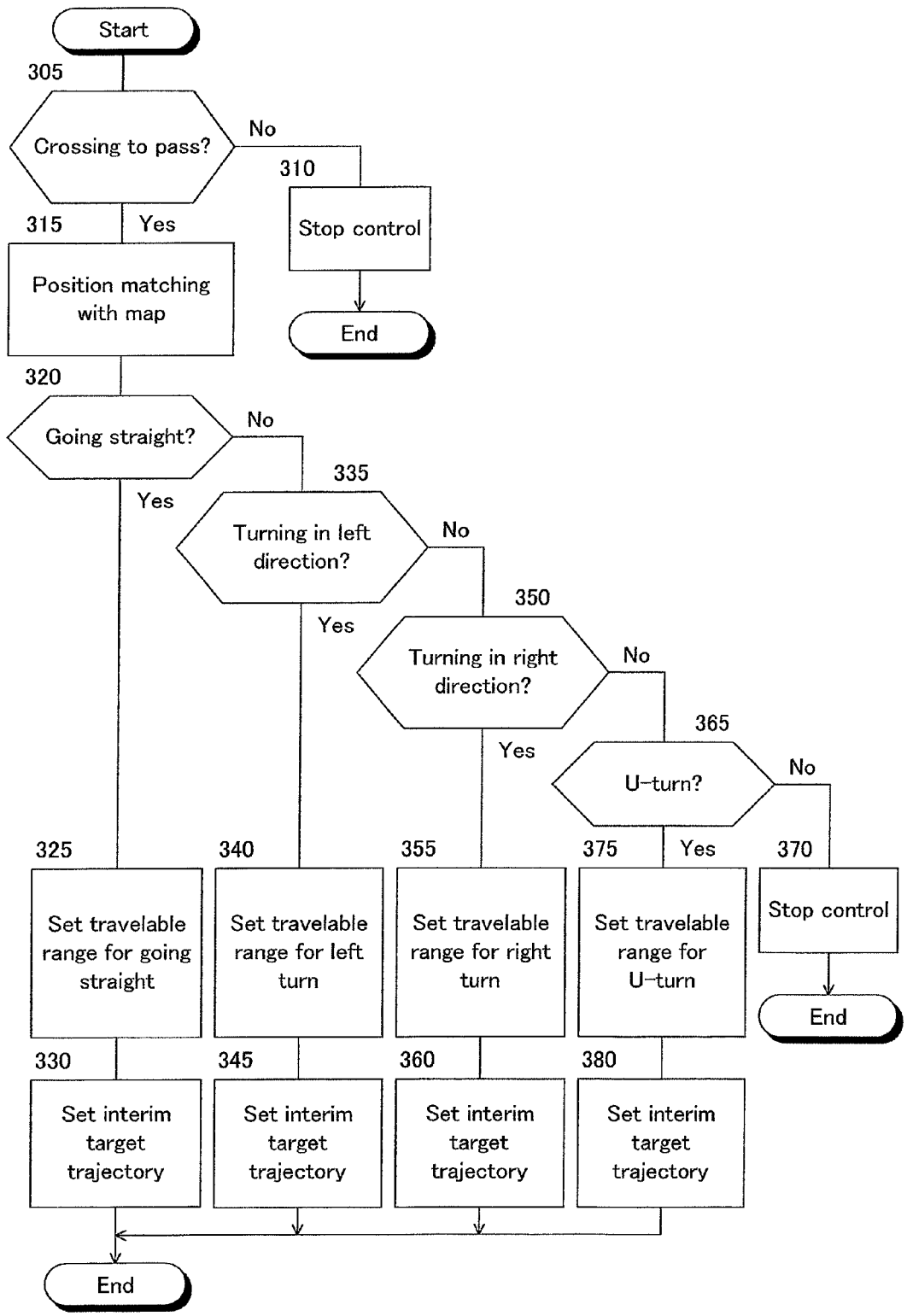
FIG. 4 is a flowchart illustrating an interim target trajectory setting routine based on navigation information in step 300 illustrated in FIG. 3.

Next, the following describes the setting of an interim target trajectory based on navigation information in step 300 mentioned above, while referring to the flowchart illustrated in FIG. 4.

First of all, in step 305, it is determined whether a branch point that a vehicle is to pass through from now on is a branch point on a traveling route set by the navigation device 80. Then, when the result of the determination is negative, the trajectory control is stopped at a stage where the vehicle enters a particular area in step 310, and when the result of the determination is affirmative, the control proceeds to step 315.

It should be noted that the determination in step 305 is carried out in the case where a branch point exists at a distance from the current location within a range from a first distance D1 to a second distance D2, or in the case where a branch point exists in an area that a vehicle passes in an elapse period from the current time in a range from a first time T1 to a second time T2. The distances D1, D2 and the times T1, T2 may be constants. It is preferable, however, that the distances D1 and D2 are variably set according to a vehicle speed so that, for example, the higher the vehicle speed V is, the greater the distances are.

In step 315, based on white lines and the like of forward image information of the vehicle 12 acquired by the CCD camera 68, a map for the branch point is selected from a plurality of preliminarily stored maps for branch points, whereby the map for the branch point is determined. Further, in step 315, distances to two particular objects in forward image information, for example, distances to white lines at two corners of a crossing, are estimated, whereby a current location of the vehicle on the map is estimated.

For example, the type of a branch point (a crossing, a Y-intersection, a T-intersection, etc.) is determined based on white lines and the like of image information, and the type of a map (a crossing, a Y-intersection, a T-intersection, etc.) is decided based on the determined type of the branch point. Next, from a plurality of maps of the decided type, a map is selected that has the highest degree of matching between the white lines and the like of the image information and white lines and the like on the map. The map used in this step, however, does not have to be a preliminarily stored map, but may be a map based on information supplied from the navigation device 80.

Figure 10:
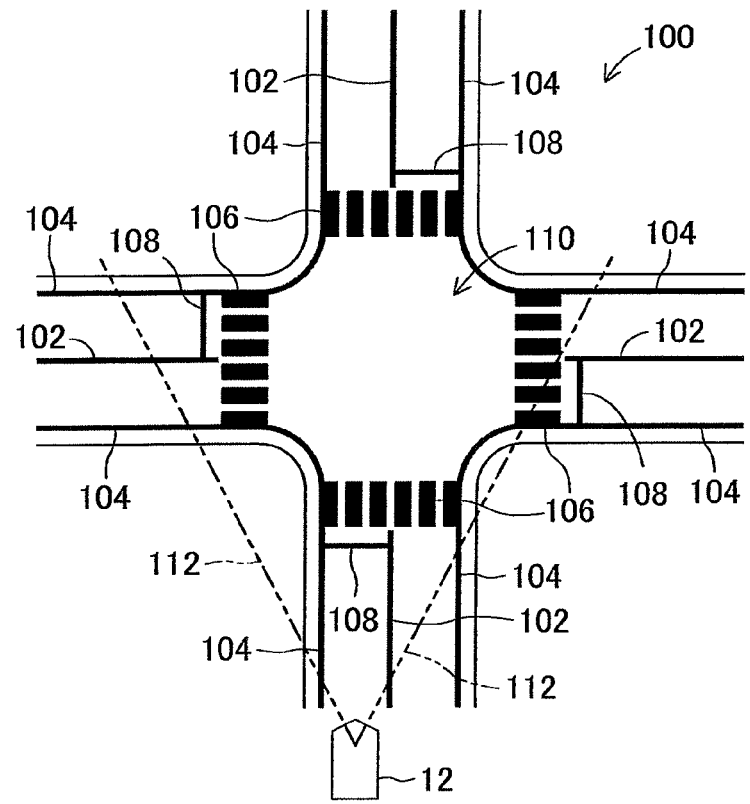
FIG. 10 explains how to determine a map and estimate a current location of a vehicle in the case where the type of a branch point is a crossing.

FIG. 10 explains how to determine a map and estimate a current location of the vehicle in the case where the type of a branch point is a crossing. In FIG. 10, "100" indicates a map, "102" and "104" indicate a white line at the center of a road and a white line at a road shoulder, respectively, and "106" and "108" indicate a crosswalk and a vehicle stop line, respectively. Further, in FIG. 10, "110" indicates a particular area where white lines 102 and 104 and the like do not exist, and "112" indicates a boundary of a range of forward image information of the vehicle 12 that the CCD camera 68 can acquire.

As illustrated in FIG. 10, a map is selected based on the white lines 104 at road shoulders at corners of the crossing and the like, from a plurality of preliminarily stored maps of crossings, whereby a map for the crossing is decided. Further, distances to the white lines 104 at the road shoulders at the two corners and the like are estimated based on the image information, and a current location of the vehicle on the map is estimated based on the estimation result.

In step 320, 335, 350, and 365, based on the traveling route set by the navigation device 80, it is determined which is a driving task at a branch point, going straight, turning to the left direction, turning to the right direction, or a U-turn.

In particular, in step 320, whether a driving task at a branch point is going straight or not is determined. Then, when the result of the determination is negative, the control proceeds to step 335, and when the result of the determination is affirmative, the control proceeds to step 325.

In step 325, on the map, white lines and the like of a traveling route that the vehicle is currently traveling and/or white lines and the like of a traveling route that the vehicle is to travel after passing through the branch point are extended to the particular area, whereby a travelable range for going straight at the branch point is set.

Figure 11:
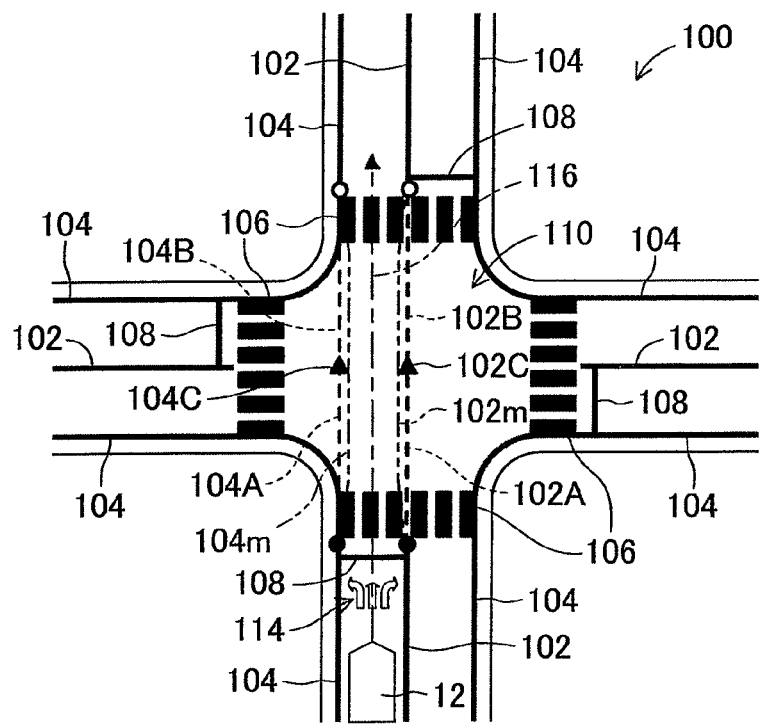
FIG. 11 explains how a travelable range for going straight is set, regarding a case where a branch point is a perpendicular crossroads.

For example, FIG. 11 explains how a travelable range for going straight is set, regarding a case where a branch point is a perpendicular crossroads. In FIG. 11 and other drawings to be referred to below, black circles indicate points at which white lines 102 and 104 terminate, and white circles indicate points at which the white lines 102 and 104 reappear, as viewed in the vehicle 12 traveling direction. "114" indicates a road marking provided on the road surface that indicates a direction in which the vehicle can advance.

In FIG. 11, the white lines 102 and 104 of the traveling route that the vehicle 12 is currently traveling are extended in a vehicle traveling direction, toward the particular area 110, whereby virtual white lines 102A and 104A are obtained, respectively. Further, the white lines 102 and 104 of the traveling route that the vehicle is to travel after passing through the crossing are extended in a direction opposite to the vehicle traveling direction, toward the particular area 110, whereby virtual white lines 102B and 104B are obtained, respectively. In FIG. 11, "102C" and "104C" indicate points of connection of the virtual white lines 102A, 104A and the virtual white lines 102B, 104B, respectively.

Further, boundary lines 102m and 104m of a travelable range for going straight are set between the virtual white lines 102A and 104A, and between the virtual white lines 102B and 104B, respectively, at positions displaced toward the center of the traveling route by preliminarily set margins with respect to the corresponding white lines. The travelable range for going straight is a range between the boundary lines 102m and 104m.

Figure 12:
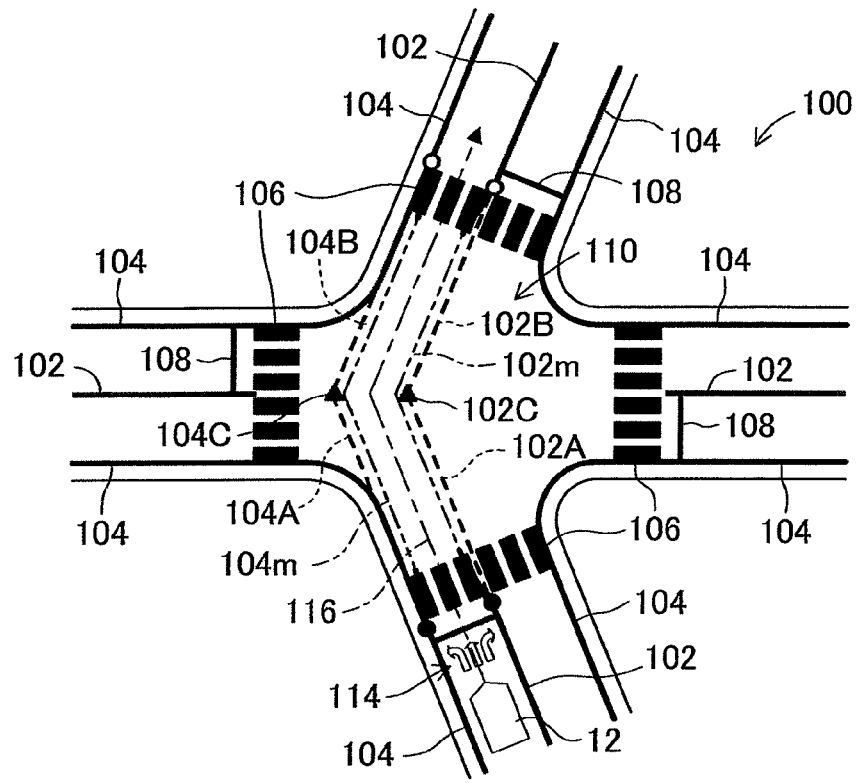
FIG. 12 explains how a travelable range for going straight is set, regarding a case where a branch point is a non-perpendicular crossroads.

It should be noted that the above-described setting of a travelable range for going straight is not limited to the case where a branch point is a perpendicular crossroads. Identical setting is applicable to, for example, the case where branch point is a non-perpendicular crossroads, as illustrated in FIG. 12. In this case, however, the vehicle travelable range is not in a perfect linear form, but is tilted at a certain angle at a branch point.

Further, in the case where a branch point is a T-intersection, setting is identical to that in the case of FIG. 11, which is only different in that either the traveling route for the turning to the left or the traveling route for turning to the right does not exist. Likewise, in the case where a branch point is a Y-intersection and the traveling route is nearly a route for going straight, setting is substantially identical to that in the case of FIG. 12, which is only different in that the traveling route for turning to the right does not exist.

Further, in the case where a plurality of lanes are provided, though not illustrated in the drawings, a travelable range for going straight is set for a lane that a vehicle is currently traveling and a lane that the vehicle is to travel after passing a crossing, in the manner mentioned above.

In step 330, for example, an interim target trajectory is set to be a line that passes through the center of a travelable range for going straight. In FIGS. 11 and 12, "116" indicates an interim target trajectory set to be a line that connects mid-points between the boundary lines 102m and 104m.

In step 335, it is determined whether a driving task at a branch point is turning in the left direction, that is, turning to the left. Then, when the result of the determination is negative, the control proceeds to step 350, and when the result of the determination is affirmative, the control proceeds to step 340.

In step 340, on the map, white lines and the like of a traveling route that the vehicle is currently traveling and white lines and the like of a traveling route that the vehicle is to travel after turning in the left direction at the branch point are extended to the particular area, whereby a travelable range for turning to the left at the branch point is set.

Figure 13:
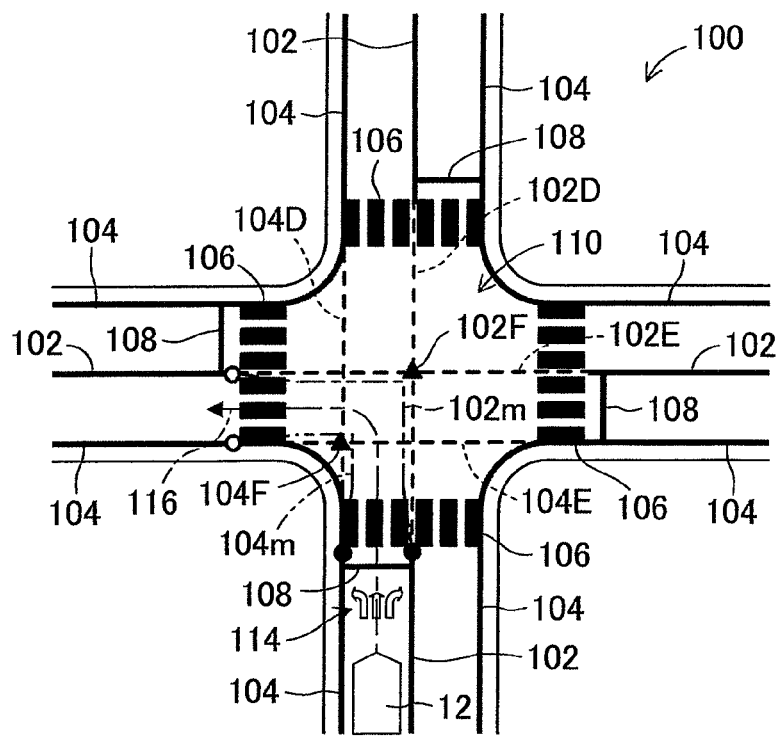
FIG. 13 explains how a travelable range for turning to the left is set, regarding a case where a branch point is a perpendicular crossroads.

For example, FIG. 13 explains how a travelable range for turning to the left is set, regarding a case where a branch point is a perpendicular crossroads.

In FIG. 13, white lines 102 and 104 of a traveling route that the vehicle 12 is currently traveling are extended to a particular area 110, whereby virtual white lines 102D and 104D are obtained, respectively. Further, the white lines 102 and 104 of the traveling route that the vehicle is to travel after turning to the left are extended to the particular area 110, whereby virtual white lines 102E and 104E are obtained, respectively. In FIG. 13, "102F" and "104F" indicate points of intersection of the virtual white lines 102D, 104D and the virtual white lines 102E, 104E, respectively.

Further, boundary lines 102*m* and 104*m* of a travelable range for turning to the left are set between the virtual white lines 102D and 104D, and between the virtual white lines 102E and 104E, respectively, at positions displaced toward the center of the traveling route by preliminarily set margins with respect to the corresponding white lines. In this case, the size of the margin at a corner on the turning inner wheel side is greater than that in the other area. The travelable range for turning to the left is a range between the boundary lines 102*m* and 104*m*.

Figure 14:
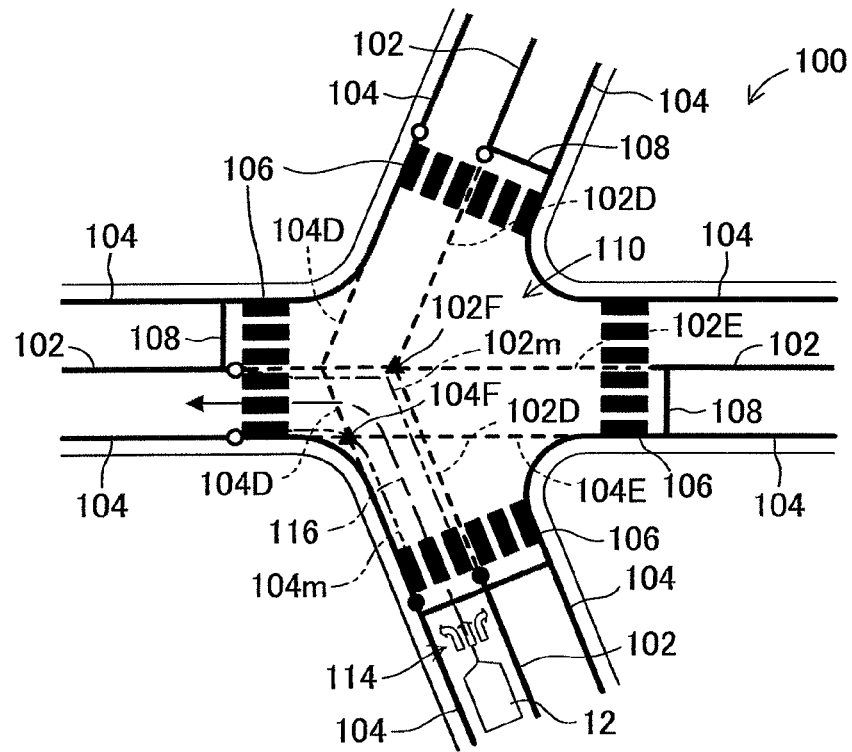
FIG. 14 explains how a travelable range for turning to the left is set, regarding a case where a branch point is a non-perpendicular crossroads.

It should be noted that the above-described setting of a travelable range for turning to the left is not limited to the case where a branch point is a perpendicular crossroads. Identical setting is applicable to, for example, the case where a branch point is a non-perpendicular crossroads, as illustrated in FIG. 14. In this case, however, the vehicle travelable range is not in a shape that is bent at a right angle, but is in a shape that is bent at an angle other than a right angle at a branch point.

Further, in the case where a branch point is a T-intersection, setting is identical to that in the case of FIG. 13, which is only different in that the traveling route for turning to the right does not exist. Likewise, in the case where a branch point is a Y-intersection, setting is substantially identical to that in the case of FIG. 14, which is only different in that the traveling route for turning to the right does not exist.

Figure 15:
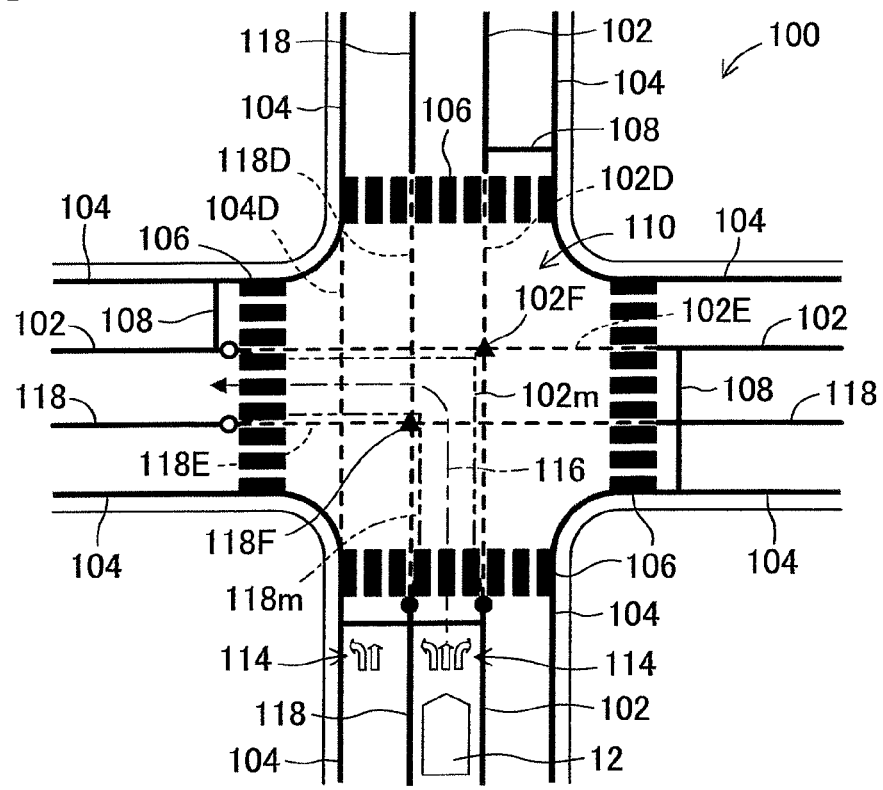
FIG. 15 explains how a travelable range for turning to the left is set, regarding a case where a plurality of lanes are provided and a branch point is a perpendicular crossroads.
Figure 16:
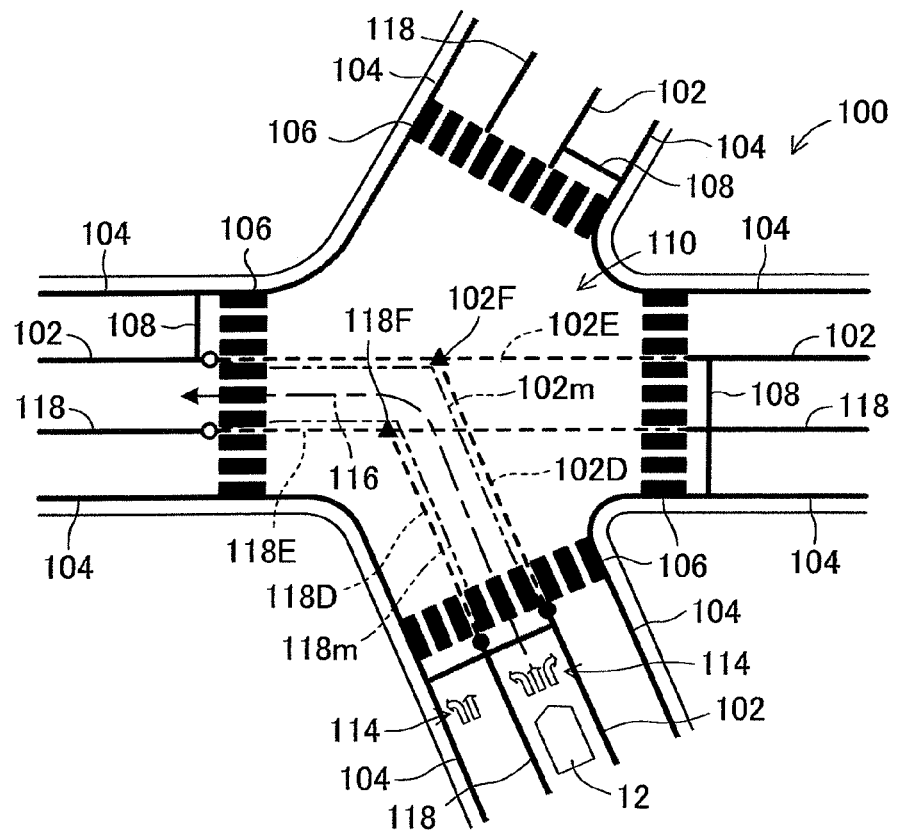
FIG. 16 explains how a travelable range for turning to the left is set, regarding a case where a plurality of lanes are provided and a branch point is a non-perpendicular crossroads.

Further, in the case where a plurality of lanes are provided, as illustrated in FIGS. 15 and 16 corresponding to FIGS. 13 and 14, respectively, a travelable range for turning to the left is set for a lane that a vehicle is currently traveling and a lane that the vehicle is to travel after turning to the left, in the manner mentioned above. In FIGS. 15 and 16, "118" indicates white lines that separate lanes; "118D" and "118E" indicate virtual white lines obtained by extending the white lines 118 to a particular area 110; and "118F" indicates a point of intersection of the virtual white lines 118D and 118E. Though FIGS. 15 and 16 illustrate the case where a vehicle travels a right side lane, the same configuration is applicable to the case where a vehicle travels a left side lane.

Further, boundary lines 102*m* and 104*m* of a travelable range for turning to the left are set between the virtual white lines 102D and 118D, and between the virtual white lines 102E and 118E, respectively, at positions displaced toward the center of the traveling route by preliminarily set margins with respect to the corresponding white lines, respectively. In this case, the size of the margin at a corner on the turning inner wheel side is greater than that in the other area. The travelable range for turning to the left is a range between the boundary lines 102*m* and 118*m*.

In step 345, for example, an interim target trajectory is set as a line that passes through the center of a travelable range for turning to the left. In FIGS. 13 and 14, "116" indicates an interim target trajectory that is set as a line that connects midpoints between the boundary lines 102*m* and 104*m* and that has a bending part in a circular arc form. Further, in FIGS. 15 and 16, "116" indicates an interim target trajectory that is set as a line that connects midpoints between the boundary lines 102*m* and 118*m* and that has a bending part in a circular arc form.

In step 350, it is determined whether a driving task at a branch point is turning in the right direction, that is, turning to the right. Then, when the result of the determination is negative, the control proceeds to step 365, and when the result of the determination is affirmative, the control proceeds to step 355.

In step 355, on the map, white lines and the like of a traveling route that the vehicle is currently traveling and white lines and the like of a traveling route that the vehicle is to travel after turning in the right direction at the branch point are extended to the particular area, whereby a travelable range for turning to the right at the branch point is set.

Figure 17:
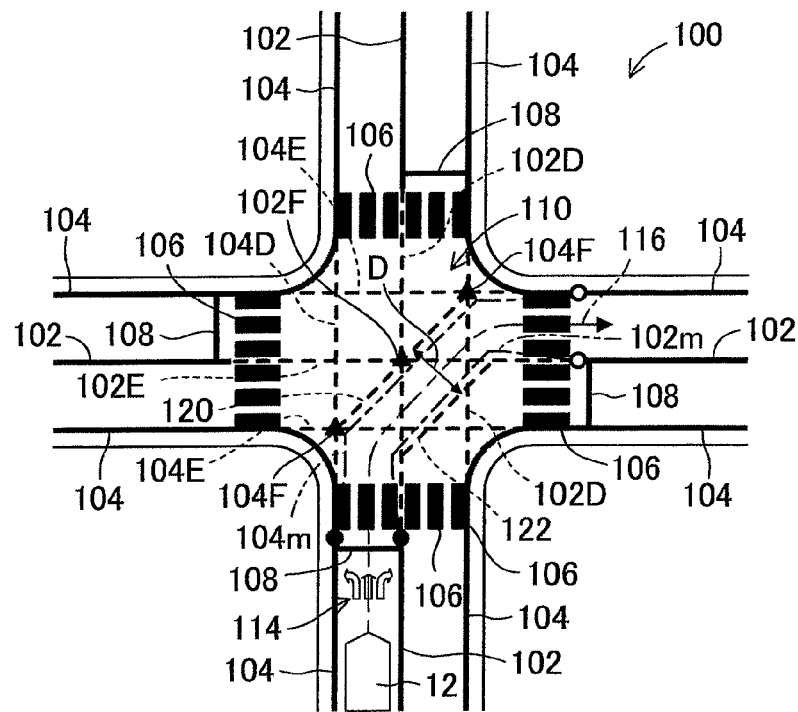
FIG. 17 explains how a travelable range for turning to the right is set, regarding a case where a branch point is a perpendicular crossroads.

For example, FIG. 17 explains how a travelable range for turning to the right is set, regarding a case where a branch point is a perpendicular crossroads.

In FIG. 17, all of white lines 102 and 104 of a road that the vehicle 12 is currently traveling are extended to the particular area 110, whereby virtual white lines 102D and 104D are obtained. Further, white lines 102 and 104 of all of roads that intersect the road that the vehicle 12 is currently traveling are extended to the particular area 110, whereby virtual white lines 102E and 104E are obtained. In FIG. 17, "102F" and "104F" indicate points of intersection of the virtual white lines 102D, 104D and the virtual white lines 102E, 104E, respectively.

Further, a line that connects points of intersection 102F, 104F, and 102F of the virtual white lines is set as a turning-outer-side virtual white line 120 for setting a travelable range. Further, a line obtained by shifting the virtual white line 120 toward the turning-inner-side by a distance D that is substantially equal to a distance between the white line 102 and the white line 104 is set as a turning-inner-side virtual white line 122.

Further, boundary lines 102*m* and 104*m* of a travelable range for turning to the right are set between the virtual white lines 102D and 104D, and between the virtual white lines 120 and 122, respectively, at positions displaced toward the center of the traveling route by preliminarily set margins with respect to the corresponding white lines, respectively. The travelable range for turning to the right is a range between the boundary lines 102*m* and 104*m*.

Figure 18:
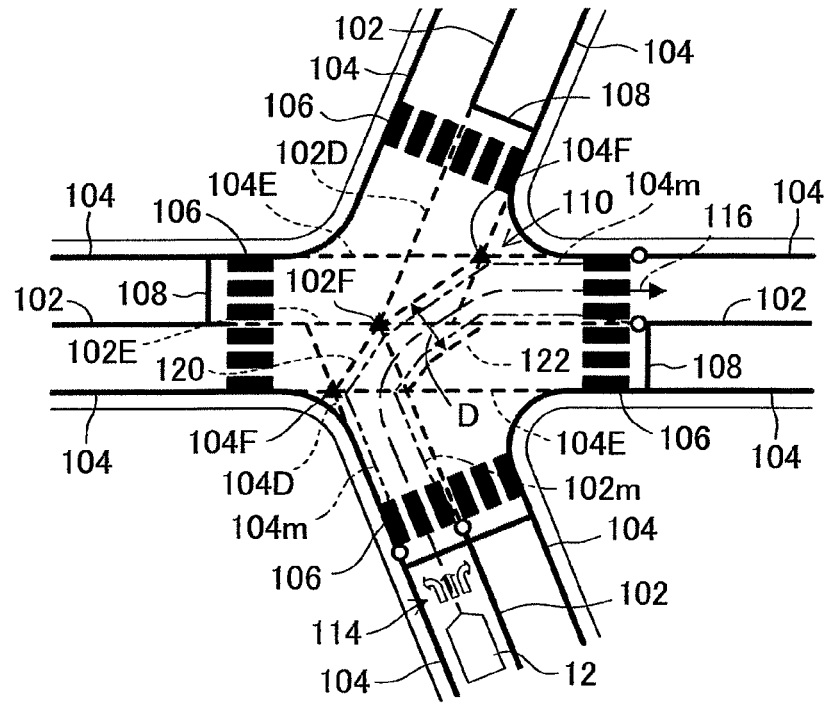
FIG. 18 explains how a travelable range for turning to the right is set, regarding a case where a branch point is a non-perpendicular crossroads.

It should be noted that the above-described setting of a travelable range for turning to the right is not limited to the case where a branch point is a perpendicular crossroads. Identical setting is applicable to, for example, the case where branch point is a non-perpendicular crossroads, as illustrated in FIG. 18. In this case, however, the vehicle travelable range is not in a shape that is bent at a right angle on the whole, but is in a shape that is bent at an angle other than a right angle at a branch point on the whole.

Further, in the case where a branch point is a T-intersection, setting is identical to that in the case of FIG. 17, which is only different in that the traveling route for turning to the left does not exist. Likewise, in the case where a branch point is a Y-intersection, setting is substantially identical to that in the case of FIG. 18, which is only different in that an opposite traveling route does not exist.

Figure 19:
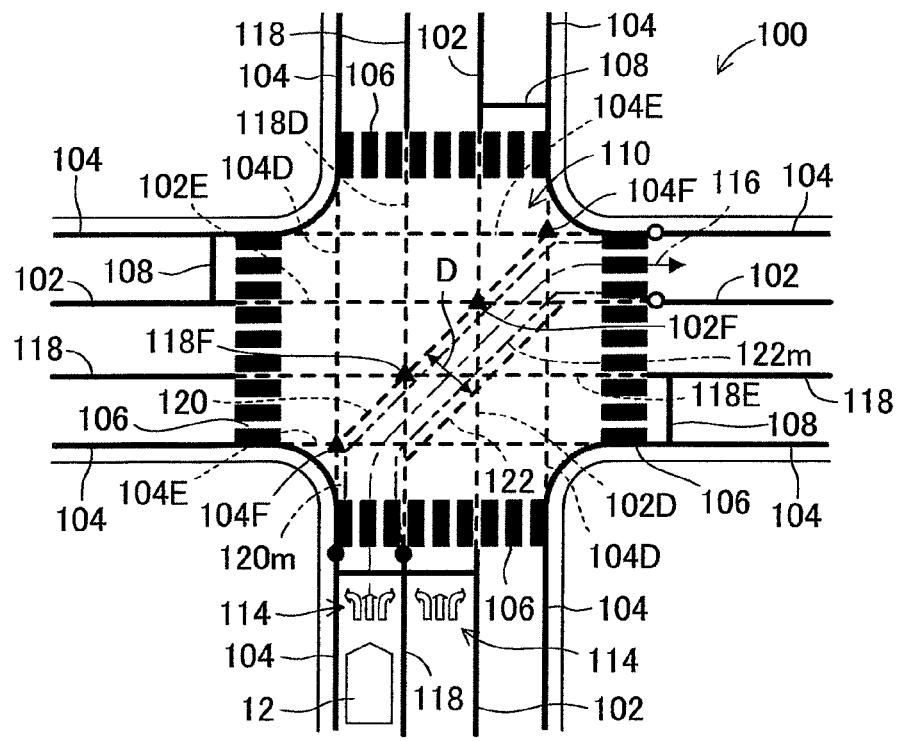
FIG. 19 explains how a travelable range for turning to the right is set, regarding a case where a plurality of lanes are provided and a branch point is a perpendicular crossroads.
Figure 20:
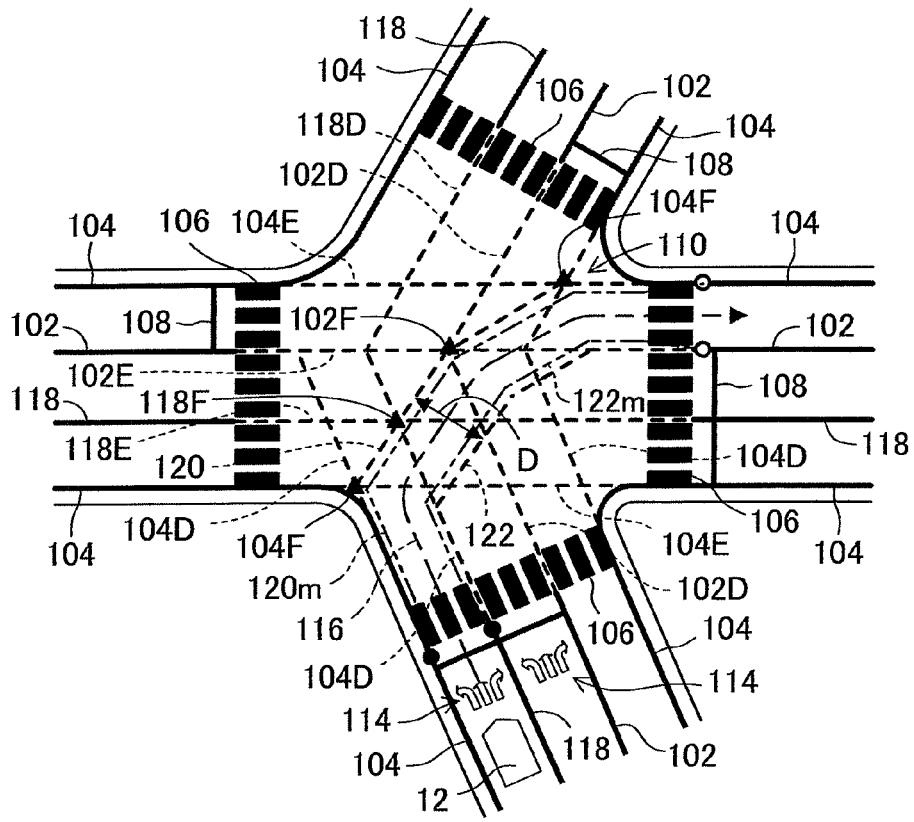
FIG. 20 explains how a travelable range for turning to the right is set, regarding a case where a plurality of lanes are provided and a branch point is a non-perpendicular crossroads.

Further, in the case where a plurality of lanes are provided, as illustrated in FIGS. 19 and 20 corresponding to FIGS. 17 and 18, respectively, a travelable range for turning to the right is set for a lane that a vehicle is currently traveling and a lane that the vehicle is to travel after turning to the right, in the manner mentioned above. As is the case with FIGS. 15 and 16, "118" indicates white lines that separate lanes; "118D" and "118E" indicate virtual white lines obtained by extending the white lines 118 to a particular area 110; and "118F" indicates a point of intersection of the virtual white lines 118D and 118E. Though FIGS. 19 and 20 illustrate the case where a vehicle travels a left side lane, the same configuration is applicable the case where a vehicle travels a right side lane.

Further, a line that connects points of intersection 104F, 118F, 102F, and 104F of the virtual white lines is set as a turning-outer-side virtual white line 120 for setting a travelable range. Further, a line obtained by shifting the virtual white line 120 toward the turning-inner-side by a distance D that is substantially equal to a distance between the white line 102 and the white line 104 is set as a turning-inner-side virtual white line 122.

Further, boundary lines 120m and 122m of a travelable range for turning to the right are set between the virtual white lines 102D and 104D, and between the virtual white lines 120 and 122, respectively, at positions displaced toward the center of the traveling route by preliminarily set margins with respect to the corresponding white lines, respectively. The travelable range for turning to the right is a range between the boundary lines 120m and 122m.

In step 360, for example, an interim target trajectory is set as a line that passes through the center of a travelable range for turning to the right. In FIGS. 17 and 18, "116" indicates an interim target trajectory that is set as a substantially circular arc line that passes between the boundary lines 102m and 104m, or a line that connects midpoints between the boundary lines 102m and 104m and that has a bending part in a circular arc form. Further, in FIGS. 19 and 20, "116" indicates an interim target trajectory that is set to be a line that connects midpoints between the boundary lines 120m and 122m and that has a bending part in a circular arc form.

In step 365, it is determined whether a driving task at a branch point is a U-turn. Then, when the result of the determination is negative, the trajectory control is stopped at a stage where the vehicle enters the particular area in step 370, and when the result of the determination is affirmative, the control proceeds to step 375.

In step 375, on the map, white lines and the like of each traveling route are extended to the particular area, whereby a travelable range for U-turn at the branch point is set.

Figure 21:
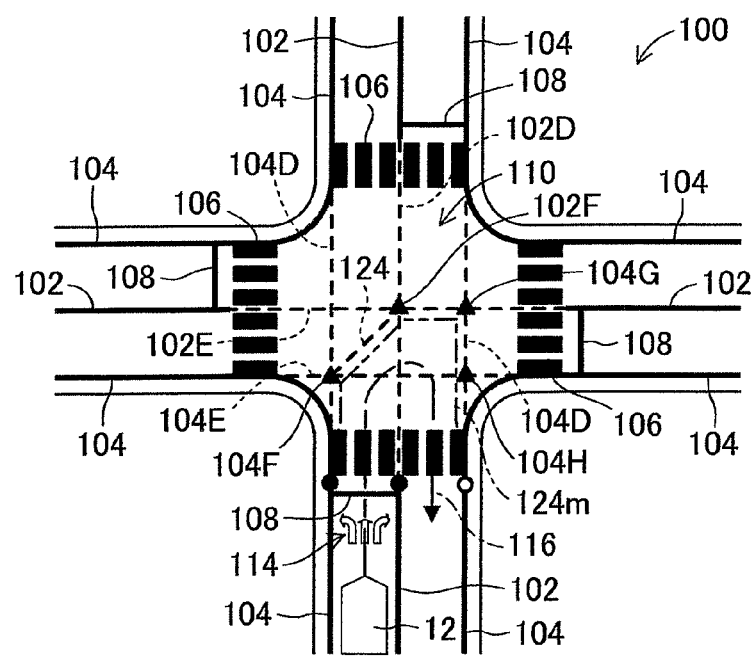
FIG. 21 explains how a travelable range for U-turn is set, regarding a case where a branch point is a perpendicular crossroads.

For example, FIG. 21 explains how a travelable range for U-turn is set, regarding a case where a branch point is a perpendicular crossroads.

In FIG. 21, all of white lines 102 and 104 of a road that the vehicle 12 is currently traveling are extended to the particular area 110, whereby virtual white lines 102D and 104D are obtained. Further, a center white line 102 of a road that intersects the road that the vehicle 12 is currently traveling and a white line 104 on a road shoulder on the front side as viewed in the drawing are extended to the particular area 110, whereby virtual white lines 102E and 104E are obtained. In FIG. 21, "102F" and "104F" indicate points of intersection of the virtual white lines 102D, 104D and the virtual white lines 102E, 104E, respectively. Further, "104G" and "104H" indicate points of intersection of the virtual white lines 104D on the opposite lane side with the virtual white lines 102E and 104E, respectively.

Further, lines 124 and 104D that connect points of intersection 104F, 102F, 104G, and 104H of the virtual white lines are set as turning-outer-side virtual white lines for setting a travelable range. Further, lines obtained by shifting the turning-outer-side virtual white lines toward the turning-inner-side by a distance that is substantially equal to a distance between the white line 102 and the white line 104 may be set as turning-inner-side virtual white lines, but these virtual white lines do not have to be set.

Further, a boundary line 124m of a travelable range for U-turn is set at a position displaced toward the turning-inner-side by preliminarily set margins with respect to the virtual white lines 104D, 124, and 104D. The travelable range for U-turn is a range in which a vehicle can travel on the turning-inner-side with respect to the boundary line 124m.

Figure 22:
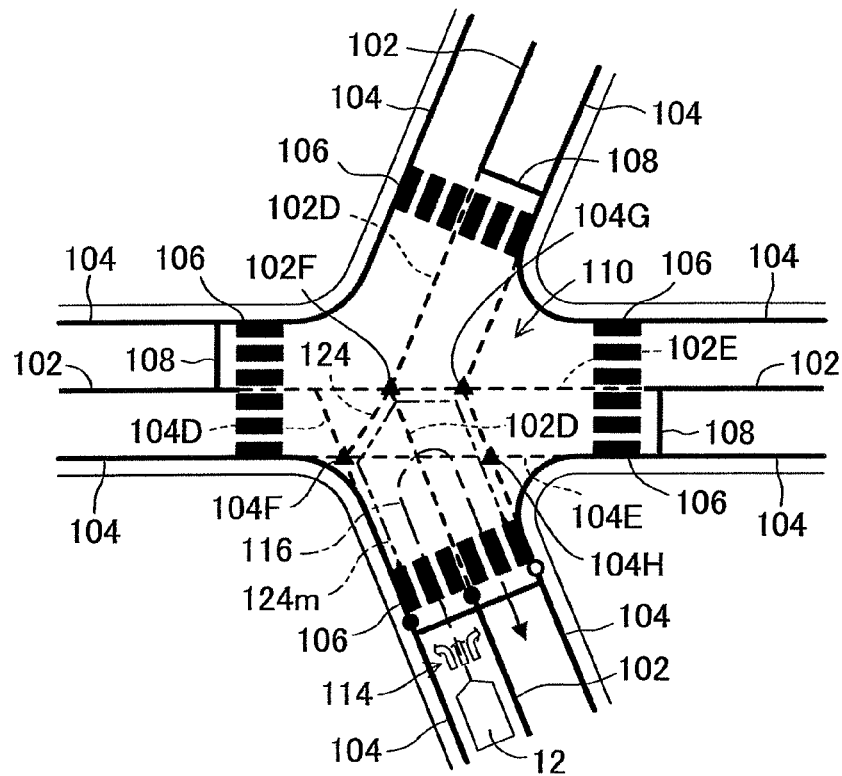
FIG. 22 explains how a travelable range for U-turn is set, regarding a case where a branch point is a non-perpendicular crossroads.

It should be noted that the above-described setting of a travelable range for U-turn is not limited to the case where a branch point is a perpendicular crossroads. Identical setting is applicable to, for example, the case where branch point is a non-perpendicular crossroads, as illustrated in FIG. 22. In this case, however, the vehicle travelable range is in a shape different form that of the case where a branch point is a perpendicular crossroads.

Further, in the case where a branch point is a T-intersection, setting is identical to that in the case of FIG. 21, which is only different in that the opposite traveling route, the traveling route for turning to the left, or the traveling route for turning to the right does not exist. Likewise, in the case where a branch point is a Y-intersection, setting is substantially identical to that in the case of FIG. 22, which is only different in that the opposite traveling route or the traveling route for turning to the right do not exist. Further, in the case where a plurality of lanes are provided as well, the vehicle travelable range can be set in a similar manner as that for the case where a single lane is provided. In this case, however, the boundary line on the turning-inner-side for the travelable range is set in a similar manner as that for the case where a vehicle turns to the right at a crossroads.

In step 380, a line that passes on the turning-inner-side with respect to the boundary line 124m of the travelable range for U-turn is set as an interim target trajectory. In FIGS. 21 and 22, "116" indicates an interim target trajectory that is set to be a substantially circular arc line that passes on the turning-inner-side with respect to the boundary line 124m, or a line that extends along the boundary line 124m and that has a bending part in a circular arc form.

<Setting of Interim Target Trajectory Based on Picked-Up Image Information>

Figure 5:
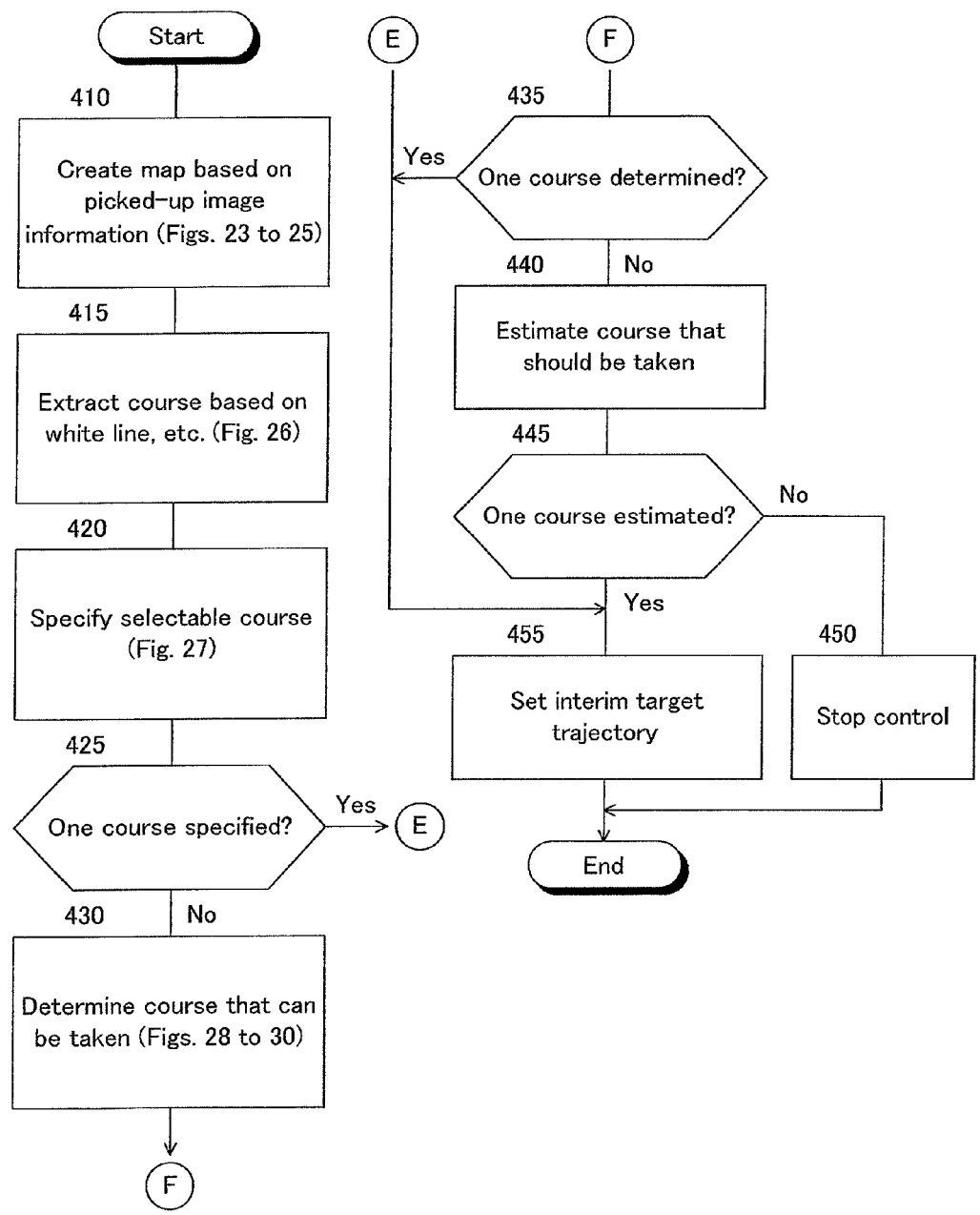
FIG. 5 is a flowchart illustrating an interim target trajectory setting routine based on picked-up image information in step 400 illustrated in FIG. 3.

Next, referring to the flowchart illustrated in FIG. 5, the following describes the setting of an interim target trajectory based on picked-up image information in step 400 mentioned above.

First, in step 410, a map of a branch point ahead of the vehicle 12 is created based on forward image information of the vehicle 12 acquired by the CCD camera 68, and a current location of the vehicle itself on the map is specified. It should be noted that the map of the branch point is created based on image information acquired by the CCD camera 68 when transition from normal trajectory control to interim trajectory control starts, and may be corrected occasionally based on image information acquired thereafter by the CCD camera 68.

Figure 23:
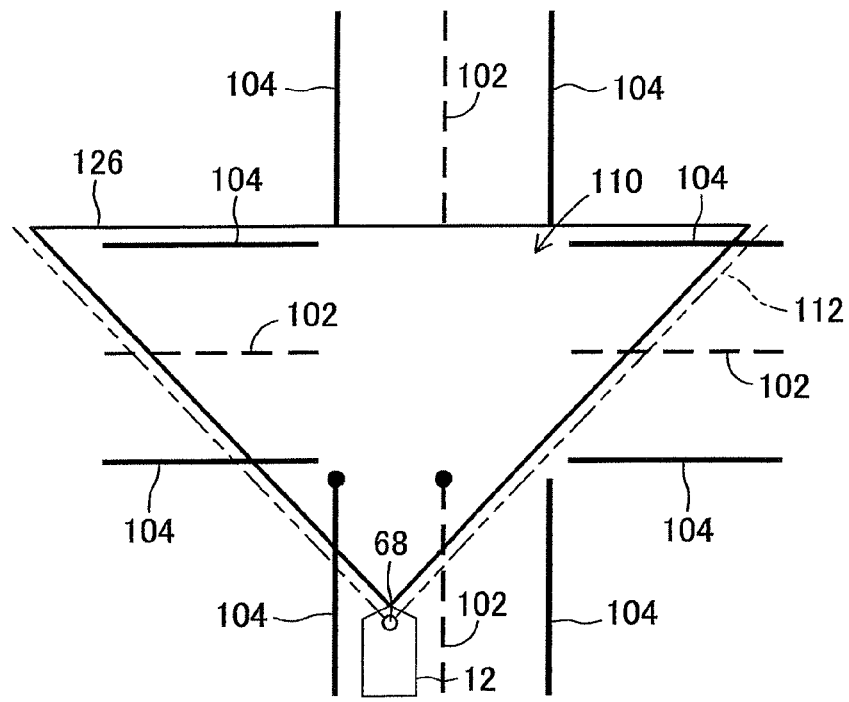
FIG. 23 illustrates boundaries of a range whose image is picked up by a CCD camera when a vehicle travels in front of a perpendicular crossroads, and a range of the crossroads recognized by the image pickup.

FIG. 23 illustrates boundaries 112 of a range whose image is picked up by the CCD camera 68 when the vehicle 12 travels in front of a perpendicular crossroads, and a range 126 of the crossroads recognized by the image pickup. In the case of the crossroads illustrated in FIG. 23, first, a map of the crossroads regarding the range 126 is created, and at the same time, the current location of the vehicle on the map is specified.

Figure 24:
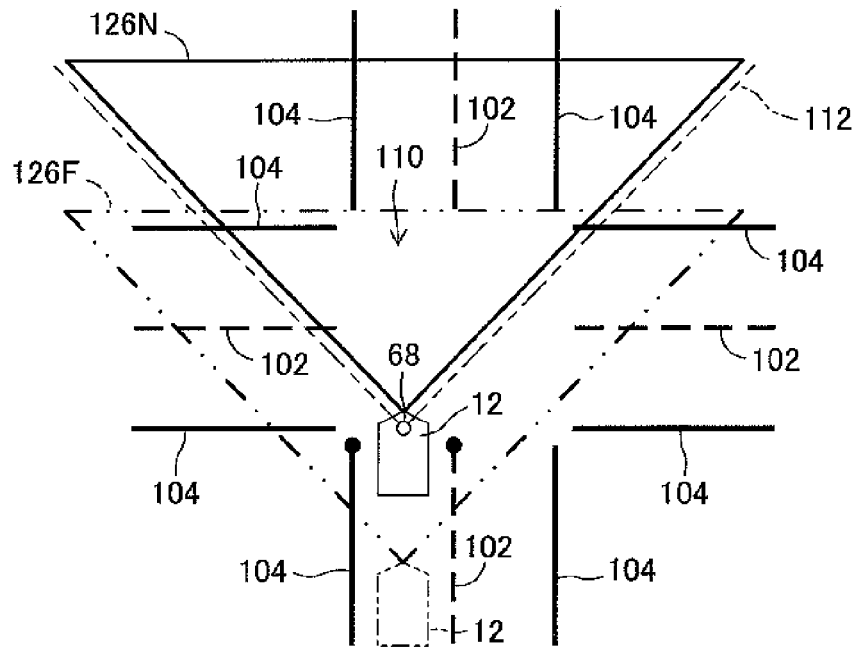
FIG. 24 illustrates a case where a vehicle goes straight through a perpendicular crossroads after a map is created.
Figure 25:
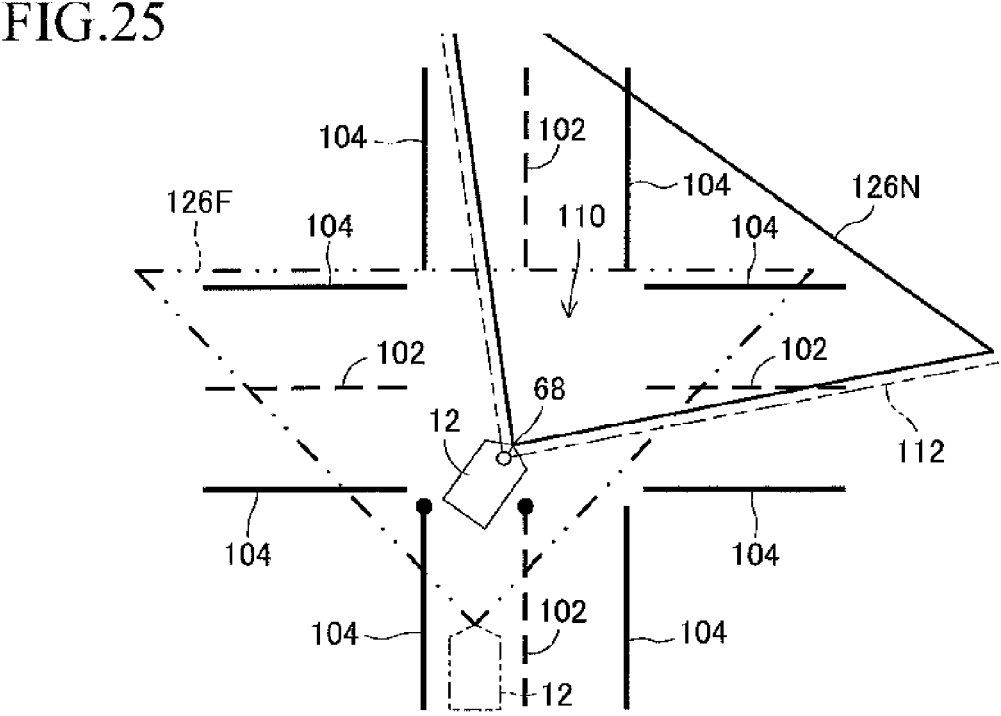
FIG. 25 illustrates a case where a vehicle turns to the right through a perpendicular crossroads after a map is created.

Further, FIGS. 24 and 25 illustrate a case where the vehicle 12 goes straight through a perpendicular crossroads and a case where the vehicle 12 turns to the right, after the map is created, respectively. In these drawings, "126F" and "126N" indicate a range of the crossroads when transitory trajectory control is started and a range of the crossroads that is recognized by image pickup at the present time, respectively. In these drawings, an area where the ranges 126F and 126N overlap each other is an area for which information of the map is corrected as required so that accuracy of the map is enhanced. Further, an area that is covered by the range 126N alone is an area for which information is added to the map as required so that the range of the map is enlarged.

In step 415, based on white lines and the like of the map created in step 410, areas between white lines and the like are extracted, regarding all of roads around a particular area, whereby a vehicle passable area is extracted as a course.

Figure 26:
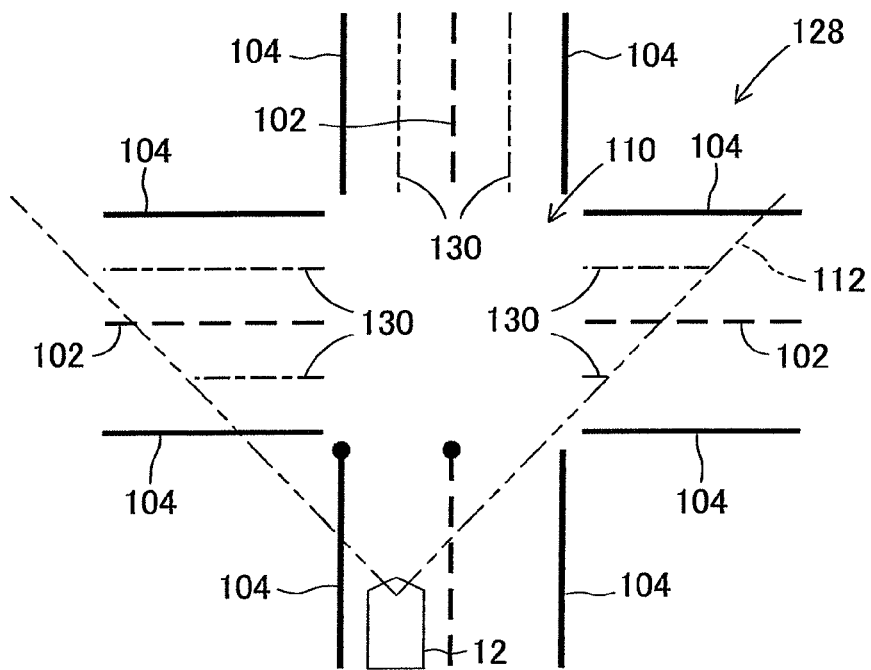
FIG. 26 illustrates a created map of a perpendicular crossroads.

FIG. 26 illustrates a created map 128 of a perpendicular crossroads. In step 415, in the map 128, all areas between the white lines 102 and 104 are extracted as courses 130 from all of roads around the particular area 110, except for the traveling route that the vehicle 12 is currently traveling.

In step 420, selectable courses are specified from among courses extracted in step 415 based on road signs and road markings included in image information acquired by the CCD camera 68. Road signs and road marking used in this case indicate, for example, whether a vehicle is allowed to advance, such as "only going straight and turning to the left permitted", "no right turn", "no U-turn", "no entry", and "no entry for vehicles". Further, a course in which road signs and road markings are seen upside down when a vehicle attempts to advance, that is, road signs and road markings that indicate that a vehicle is to advance the course in an opposite direction, may be used.

Figure 27:
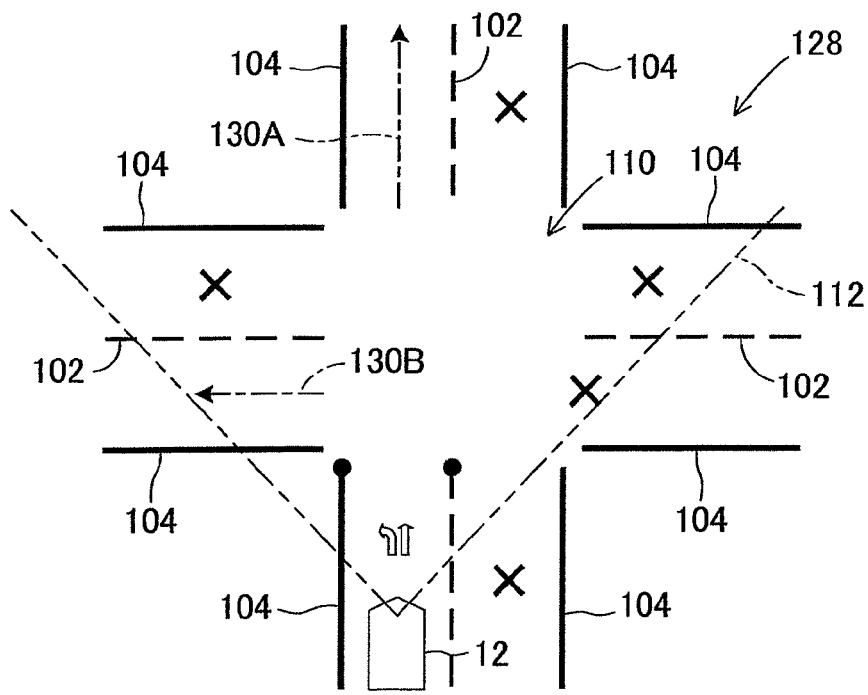
FIG. 27 illustrates a situation in which, according to road signs and road markings, a course for going straight and a course for turning to the left are specified as selectable courses among the courses illustrated in FIG. 26.

FIG. 27 illustrates a situation in which, according to road signs and road markings indicating "only going straight and turning to the left permitted", "no right turn", "no U-turn", and the like, a course 130A for going straight and a course 130B for turning to the left are specified as selectable courses among the courses 130 illustrated in FIG. 26. It should be noted that "x" in FIG. 27 and FIG. 28 to be referred to below indicates that the course cannot be selected.

In step 425, it is determined whether a single course that should be taken is determined; that is, whether a single course is specified in step 420. Then, when the result of the determination is affirmative, the control proceeds to step 455, and when the result of the determination is negative, the control proceeds to step 430.

In step 430, a curvature of a traveling trajectory, a rudder angle of the front wheels, a lateral acceleration of the vehicle, and a change in the magnitude of a yaw rate of the vehicle in the case where the vehicle travels each course specified in step 420 are estimated, and it is determined whether a maximum value of any one of these exceeds a reference value (positive value) thereof. Then, a course for which any one of the maximum values of the magnitudes of the above-described parameters used for determination (hereinafter referred to as determination parameters) does not exceed the reference value thereof is determined to be a course that can be taken.

Figure 28:
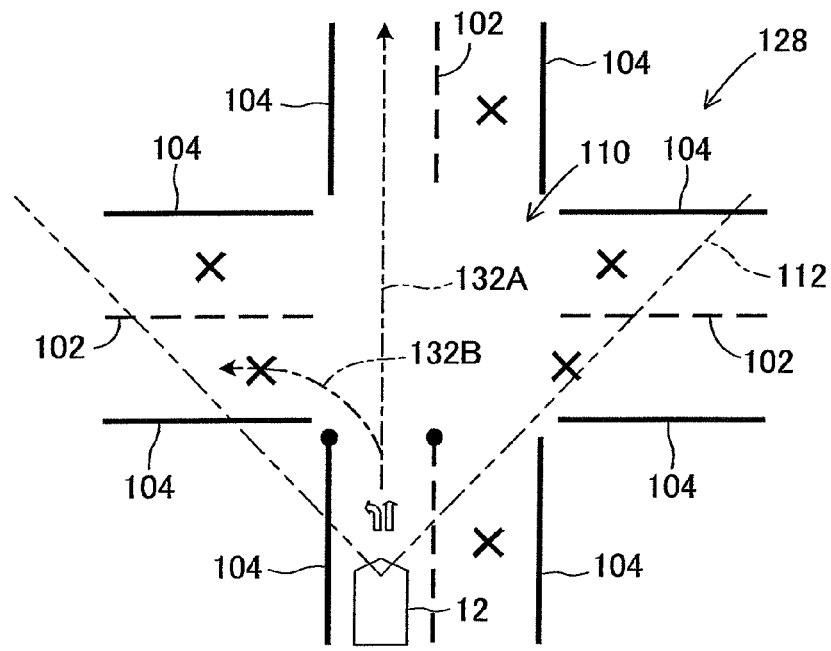
FIG. 28 illustrates interim target trajectories in the case where a vehicle travels the course for going straight and in the case where a vehicle travels the course for turning to the left, at the perpendicular crossroads illustrated in FIG. 27.

FIG. 28 illustrates an interim target trajectory 132A in the case where a vehicle 12 travels the course 130A for going straight, and an interim target trajectory 132B in the case where a vehicle 12 travels the course 130B for turning to the left, at the perpendicular crossroads illustrated in FIG. 27. Then, changes in the absolute values of the above-described determination parameters in the cases where the vehicle 12 travels along the interim target trajectories 132A and 132B are estimated. The solid line and the broken line in FIG. 29 indicate exemplary changes in the absolute value in the above-described determination parameter in the cases where the vehicle 12 travels along the interim target trajectories 132A and 132B, respectively.

Figure 29:
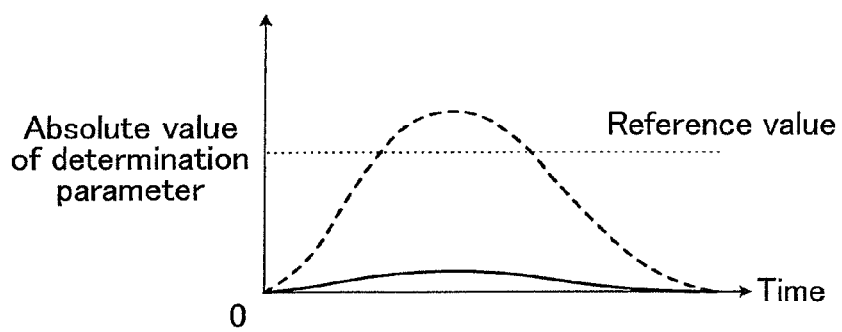
FIG. 29 is a graph that indicates changes in absolute values of a determination parameter in the case where a vehicle travels along an interim target trajectory for going straight and in the case where a vehicle travels along an interim target trajectory for turning to the left.

As illustrated in FIG. 29, the following is assumed: in the case where the vehicle 12 travels along the interim target trajectory 132A, the absolute value of the determination parameter is at or below the reference value; but in the case where the vehicle 12 travels along the interim target trajectory 132B, the absolute value of the determination parameter exceeds the reference value. In this case, the course 130A for going straight is determined to be a course that can be taken, but the course 130B for turning to the left is determined to be a course that cannot be taken.

Figure 30:
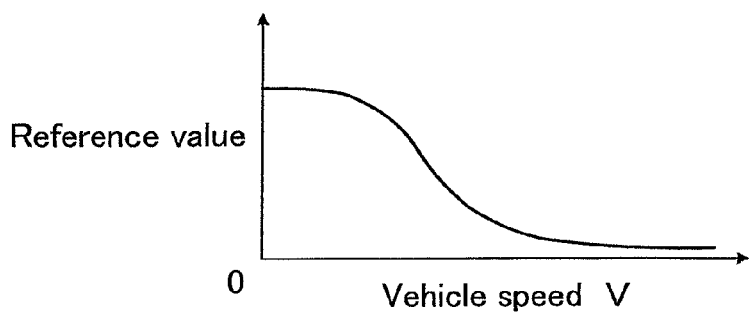
FIG. 30 is a graph that indicates the relationship between a vehicle speed V and a reference value of a determination parameter.

The determination parameter may be one of, or an arbitrary combination of, a curvature of a traveling trajectory, a rudder angle of front wheels, a lateral acceleration of a vehicle, and a yaw rate of a vehicle. Further, the reference value may be a constant value as to each determination parameter; or alternatively, as illustrated in FIG. 30, for example, the reference value may be variably set according to the vehicle speed V, in such a manner that the reference value decreases as the vehicle speed V is higher.

In step 435, it is determined whether a single course that should be taken is determined; that is, whether a single course is determined in step 430. Then, when the result of the determination is affirmative, the control proceeds to step 455, and when the result of the determination is negative, the control proceeds to step 440.

In step 440, based on an intention displayed by an occupant regarding the course and/or changes in the traveling state when the vehicle travels the particular area, one course that should be taken is estimated from a plurality of courses that can be selected.

First, it is determined whether an intension is displayed by the occupant regarding the course. For example, when a winker is being operated, it is estimated that the course on the side indicated by the winker is one course that should be taken. Further, when the driver is turning the steering wheel in the right turn direction or the left turn direction, it is estimated that the course on the side to which the steering wheel is turned is one course that should be taken. Still further, a speech that indicates a course that the occupant wishes for, such as "left", "going straight", or "right", is detected, it is estimated that the course in the direction according to the detection is one course that should be taken.

Further, when it is determined that there is no intension displayed by the occupant regarding the course, changes in the traveling state of the vehicle that occur when the vehicle travels the particular area are estimated, and it is estimated that the course having the least changes is one course that should be taken. In this case, the traveling state to be determined may be, for example, a curvature of a traveling trajectory of the vehicle, a rudder angle of the left and right front wheels, or a turning state amount such as a yaw rate and a lateral acceleration of the vehicle. It should be noted that in the case where there is not any change in the traveling state, it is estimated that a course for going straight or a course close to going straight is one course that should be taken.

In step 445, it is determined whether a single course that should be taken is estimated; that is, whether a single course is estimated in step 440. Then, when the result of the determination is affirmative, the control proceeds to step 455, and when the result of the determination is negative, in step 450, trajectory control is stopped at a stage where the vehicle enters the particular area, as is the case with step 310.

In step 455, based on the single course that should be taken, decided in step 420, 430, or 440, an interim target trajectory for allowing the vehicle to travel along the foregoing course is set. It should be noted that the setting itself of the interim target trajectory may be carried out in the manner identical to that of the above-described setting of an interim target trajectory based on navigation information.

<Setting of Transitory Target Trajectory for Transition from Normal Trajectory Control to Interim Trajectory Control>

Figure 6:
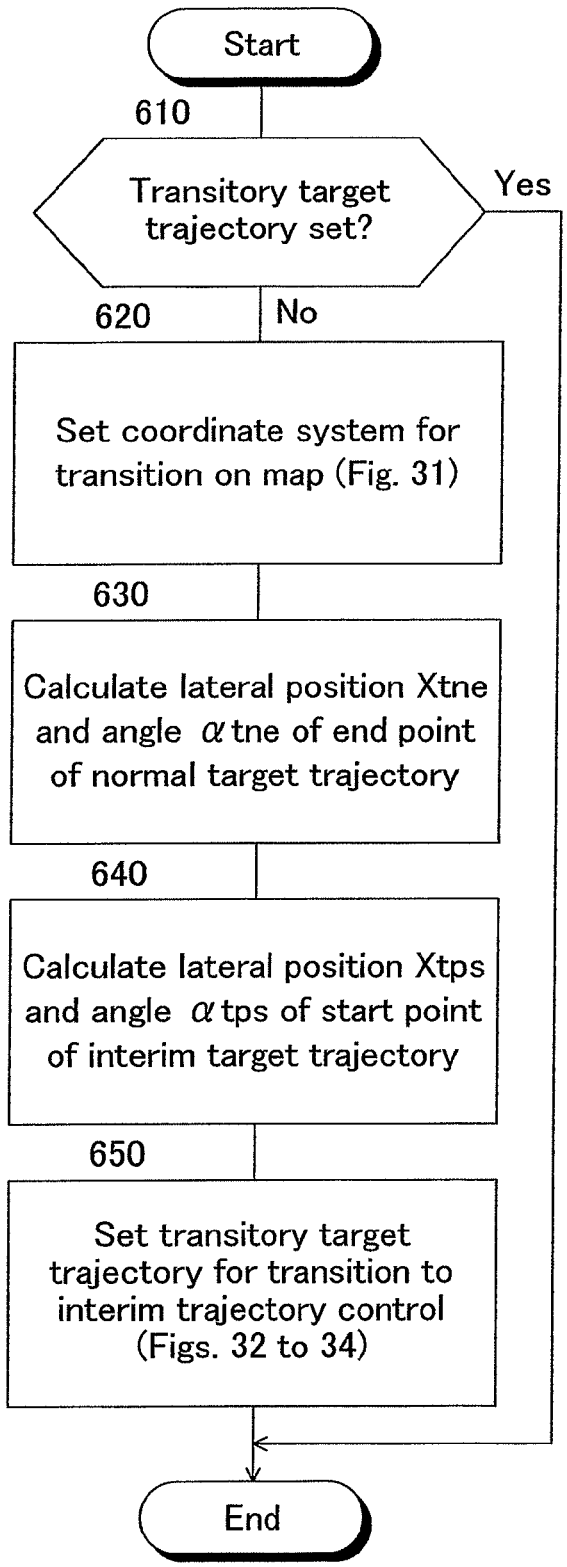
FIG. 6 is a flowchart illustrating a target trajectory setting routine executed in step 600 illustrated in FIG. 3 for transition from normal trajectory control to interim trajectory control.

Next, referring to the flowchart illustrated in FIG. 6, the following describes the setting of a transitory target trajectory for transition from normal trajectory control to interim trajectory control, which is executed in step 600 in the flowchart illustrated in FIG. 3.

First, in step 610, whether a transitory target trajectory has been set already is determined. When the result of the determination is affirmative, the control proceeds to step 910, and when the result of the determination is negative, the control proceeds to step 620.

In step 620, a current location of the vehicle and a direction in which the vehicle is advancing on the map are estimated, and a coordinate system for transition from normal trajectory control to interim trajectory control is set on the map based on the current location and the advancing direction of the vehicle.

Figure 31:
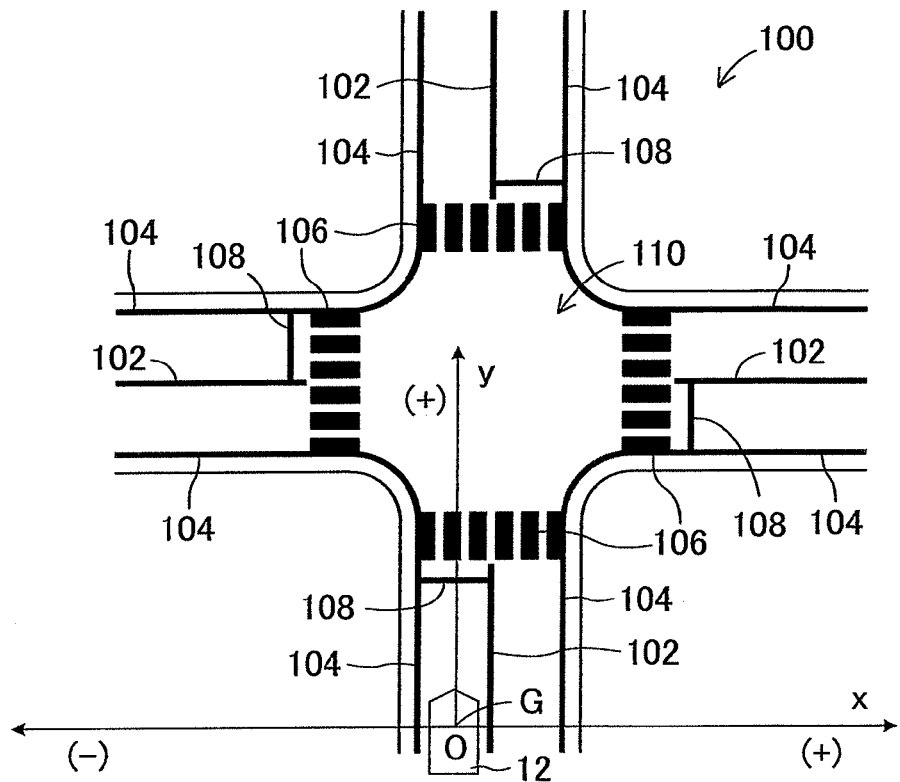
FIG. 31 illustrates a coordinate system that is set when a vehicle comes close to a perpendicular crossroads.

FIG. 31 illustrates, as an example, a coordinate system that is set when a vehicle comes close to a perpendicular crossroads. As illustrated in FIG. 30, a coordinate system is set so that the origin thereof is positioned at the current location of the vehicle 12, for example, the center of gravity G of the vehicle, the x-axis is consistent with the vehicle width direction (the right direction is positive), and the y-axis is consistent with the vehicle front-back direction (the advancing direction is positive).

In step 630, a position of an end point of a normal target trajectory (coordinates (Xtne, Ytne) in the coordinate system set in step 620) and a tilt angle of the normal target trajectory at the end point (an angle $\alpha tne$ with respect to the y-axis direction) are calculated.

In step 640, a position at a start point of an interim target trajectory (coordinates (Xtps, Ytps) in the coordinate system set in step 620) and a tilt angle of the interim target trajectory at the start point (an angle $\alpha tps$ with respect to the y-axis direction) are calculated.

In step 650, a transitory target trajectory for smoothly connecting the normal target trajectory to the interim target trajectory is set by modifying the normal target trajectory. In this case, a transitory target trajectory may be set based on, for example, the coordinates (Xtne, Ytne) and (Xtps, Ytps), the angles $\alpha tne$ and $\alpha tps$, a distance from the current location of the vehicle 12 to the position where interim target trajectory control is started, or a time necessary for traveling the distance.

Figure 32:
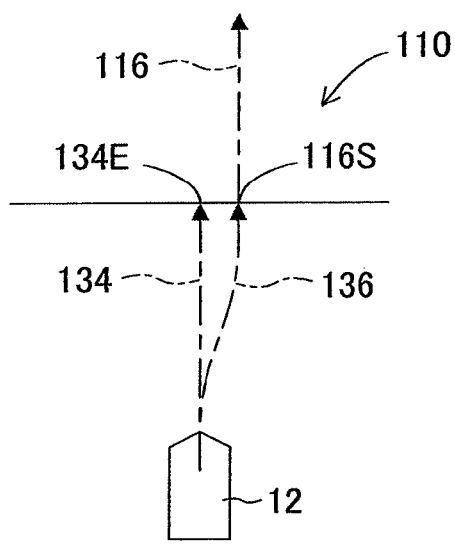
FIG. 32 illustrates an exemplary transitory target trajectory in the case where an end point of an interim target trajectory and a start point of a normal target trajectory have identical y-coordinates and identical angles, but have different x-coordinates from each other.

FIG. 32 illustrates an exemplary transitory target trajectory in the case where an end point of an interim target trajectory and a start point of a normal target trajectory have identical y-coordinates and identical angles $\alpha tne$ and $\alpha tps$, but x-coordinates Xtne and Xtps thereof are different from each other. In this case, as illustrated in FIG. 32, a normal target trajectory 134 is modified so that an x-coordinate Xtne of an end point 134E of the normal target trajectory 134 and an x-coordinate Xtps of a start point 116S of an interim target trajectory 116 should coincide with each other, whereby a transitory target trajectory 136 is set.

Figure 33:
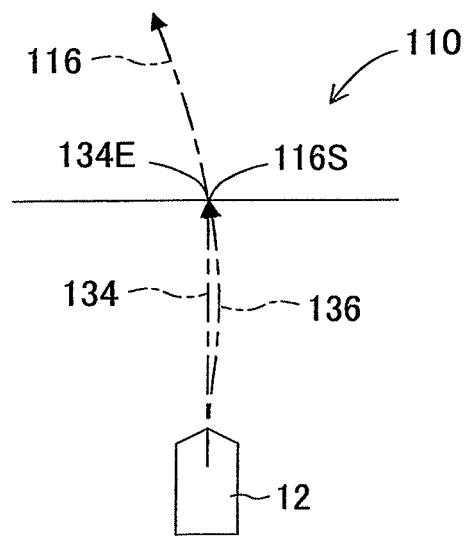
FIG. 33 illustrates an exemplary transitory target trajectory in the case where an end point of an interim target trajectory and a start point of a normal target trajectory have identical y-coordinates and identical x-coordinates, but have different angles from each other.

Further, FIG. 33 illustrates an exemplary transitory target trajectory in the case where an end point of an interim target trajectory and a start point of a normal target trajectory have identical y-coordinates and identical x-coordinates, but angles $\alpha tne$ and $\alpha tps$ thereof are different from each other. In this case, as illustrated in FIG. 33, the normal target trajectory 134 is modified so that a tilt angle of the normal target trajectory 134 at the end point 134E and a tilt angle of the interim target trajectory 116 at a start point 116S should coincide with each other, whereby a transitory target trajectory 136 is set.

Figure 34:
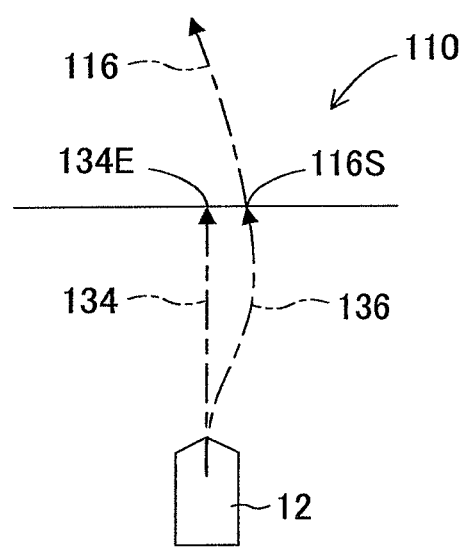
FIG. 34 illustrates an exemplary transitory target trajectory in the case where an end point of an interim target trajectory and a start point of a normal target trajectory have identical y-coordinates, but have different x-coordinates and different angles from each other.

FIG. 34 illustrates an exemplary transitory target trajectory in the case where an end point of an interim target trajectory and a start point of a normal target trajectory have identical y-coordinates, but x-coordinates Xtne and Xtp thereof are different from each other, and so are angles $\alpha tne$ and $\alpha tps$ thereof. In this case, as illustrated in FIG. 34, a transitory target trajectory 136 is set so that an x-coordinate and a tilt angle of the normal target trajectory 134 at the end point 134E, and an x-coordinate and a tilt angle of the interim target trajectory 116 at the start point 116S, should coincide with each other, respectively. Further, in the case where a branch point is a branch point other than a perpendicular crossroads, a transitory target trajectory 136 is set also.

Though not illustrated in the drawings, in the case where a y-coordinate Ytne of the end point 134E of the normal target trajectory 134 and a y-coordinate Ytp of the start point 116S of the interim target trajectory 116 are different from each other in addition to the situations illustrated in FIGS. 32 to 34, the transitory target trajectory 136 is set so that these y-coordinates should coincide with each other.

<Setting of Transitory Target Trajectory for Transition from Interim Trajectory Control to Normal Trajectory Control>

Figure 7:
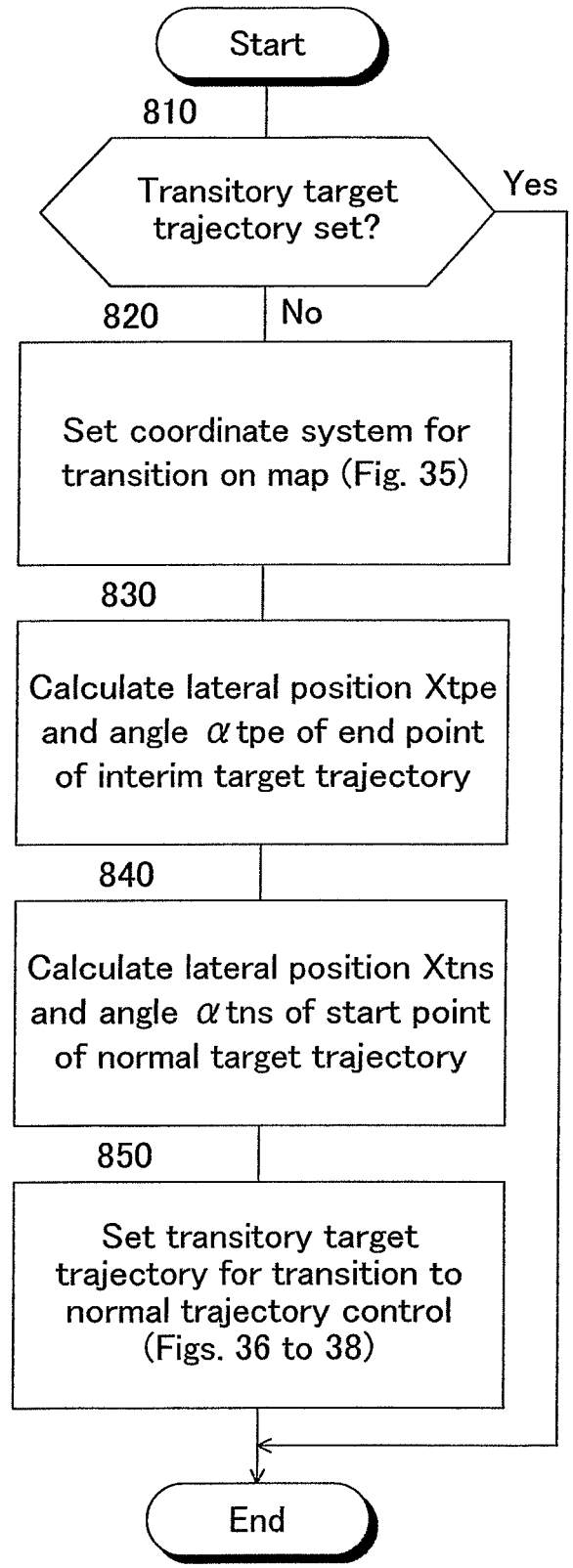
FIG. 7 is a flowchart illustrating a target trajectory setting routine executed in step 800 illustrated in FIG. 3 for transition from interim trajectory control to normal trajectory control.

Next, referring to the flowchart in FIG. 7, the following describes the setting of a transitory target trajectory for transition from interim trajectory control to normal trajectory control, which is executed in step 800 in the flowchart in FIG. 3.

First, in step 810, it is determined whether a transitory target trajectory has been set already. When the result of the determination is affirmative, the control proceeds to step 910, and when the result of the determination is negative, the control proceeds to step 820.

In step 820, a current location of the vehicle and a direction in which the vehicle is advancing on the map are estimated, and a coordinate system for transition from interim trajectory control to normal trajectory control is set on the map based on the current location and the advancing direction of the vehicle.

Figure 35:
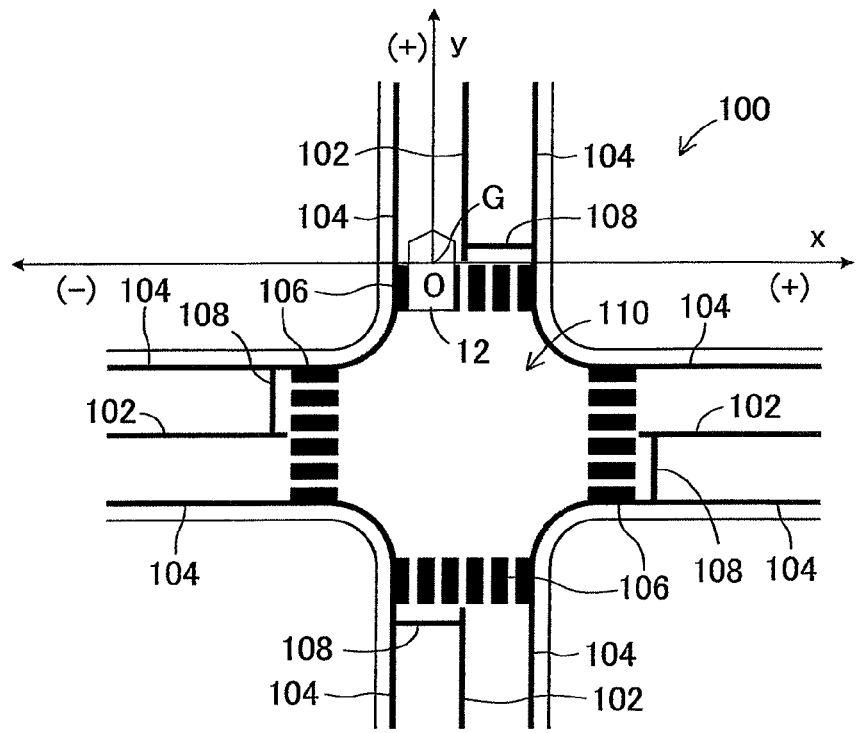
FIG. 35 illustrates a coordinate system that is set when a vehicle passes through a perpendicular crossroads.

FIG. 35 illustrates, as an example, a coordinate system that is set when a vehicle passes through a perpendicular crossroads. As illustrated in FIG. 35, as is the case where a vehicle comes close to a perpendicular crossroads, a coordinate system is set so that the origin thereof is positioned at the current location of the vehicle 12, for example, the center of gravity of the vehicle, the x-axis is consistent with the vehicle width direction (the right direction is positive), and the y-axis is consistent with the vehicle front-back direction (the advancing direction is positive).

In step 830, a position of an end point of an interim target trajectory (coordinates (Xtpe, Ytpe) in the coordinate system set in step 820) and a tilt angle of the interim target trajectory at the end point (an angle $\alpha tpe$ with respect to the y-axis direction) are calculated.

In step 840, a position at a start point of a normal target trajectory (coordinates (Xtns, Ytns) in the coordinate system set in step 820) and a tilt angle of the normal target trajectory at the start point (an angle $\alpha$tns with respect to the y-axis direction) are calculated.

In step 850, a transitory target trajectory for smoothly connecting the interim target trajectory to the normal target trajectory is set by modifying the normal target trajectory. In this case, a transitory target trajectory may be set based on, for example, the coordinates (Xtpe, Ytpe) and (Xtns, Ytns), the angles $\alpha$tpe and $\alpha$tns, or a preliminarily set transitory time or transitory distance. The transitory time or the transitory distance may be uniform, but may be variably set according to the vehicle speed V.

Figure 36:
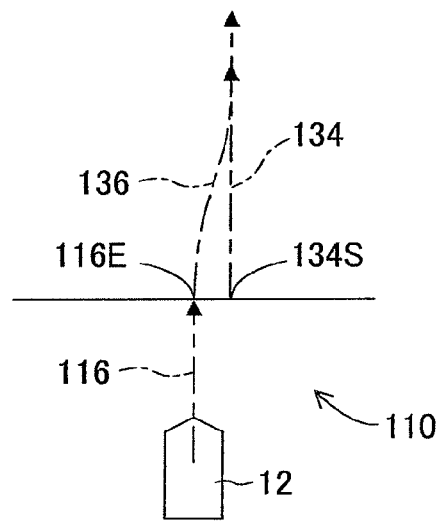
FIG. 36 illustrates an exemplary transitory target trajectory in the case where an end point of an interim target trajectory and a start point of a normal target trajectory have identical y-coordinates and identical angles, but have different x-coordinates from each other.

FIG. 36 illustrates an exemplary transitory target trajectory in the case where an end point of an interim target trajectory and a start point of a normal target trajectory have identical y-coordinates and identical angles $\alpha$tpe and $\alpha$tns, but x-coordinates Xtpe and Xtns thereof are different from each other. In this case, the normal target trajectory 134 is modified as illustrated in FIG. 36, whereby the transitory target trajectory 136 is set. More specifically, the transitory target trajectory 136 is set in the following manner: the x-coordinate of the start point thereof coincides with the x-coordinate Xtpe of the end point 116E of the interim target trajectory 116; and the transitory target trajectory 136 is extended so as to gradually approach the normal target trajectory 134 and eventually the trajectories of the both meet.

Figure 37:
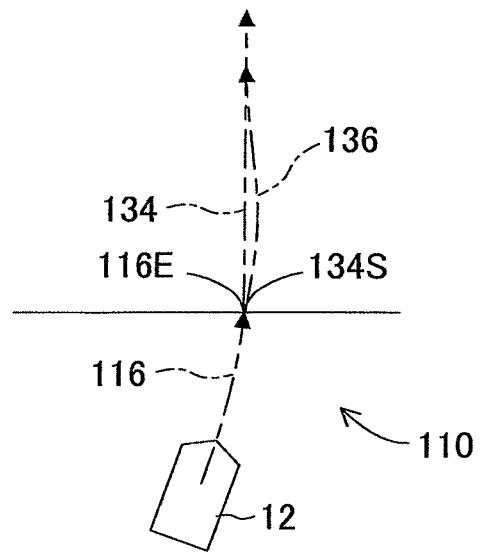
FIG. 37 illustrates an exemplary transitory target trajectory in the case where an end point of an interim target trajectory and a start point of a normal target trajectory have identical y-coordinates and identical x-coordinates, but have different angles from each other.

Further, FIG. 37 illustrates an exemplary transitory target trajectory in the case where an end point of an interim target trajectory and a start point of a normal target trajectory have identical y-coordinates and identical x-coordinates, but angles $\alpha$tne and $\alpha$tps thereof are different from each other. In this case, the normal target trajectory 134 is modified as illustrated in FIG. 37, whereby the transitory target trajectory 136 is set. More specifically, the transitory target trajectory 136 is set in the following manner: the angle thereof at the start point coincides with the angle of the interim target trajectory 116 at the end point 116E; and the direction of the transitory target trajectory 136 gradually approaches the direction of the normal target trajectory 134, and eventually the trajectories of the both meet.

Figure 38:
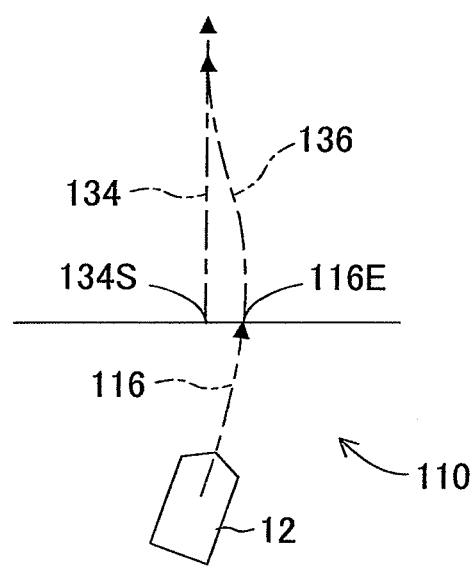
FIG. 38 illustrates an exemplary transitory target trajectory in the case where an end point of an interim target trajectory and a start point of a normal target trajectory have identical y-coordinates, but have different x-coordinates and different angles from each other.

FIG. 38 illustrates an exemplary transitory target trajectory in the case where an end point of an interim target trajectory and a start point of a normal target trajectory have identical y-coordinates, but x-coordinates Xtne and Xtp thereof are different from each other, and so are angles $\alpha$tne and $\alpha$tps thereof. In this case, the normal target trajectory 134 is modified as illustrated in FIG. 38, whereby the transitory target trajectory 136 is set. More specifically, the transitory target trajectory 136 is set in the following manner: the angle thereof at the start point coincides with the angle of the interim target trajectory 116 at the end point 116E; and the transitory target trajectory 136 is extended so as to gradually approach the normal target trajectory 134, and eventually the trajectories of the both meet.

Though not illustrated in the drawings, in the case where a y-coordinate Ytps of the start point 116S of the interim target trajectory 116 and a y-coordinate Ytne of the end point 134E of the normal target trajectory 134 are different from each other in addition to the situations illustrated in FIGS. 36 to 38, the transitory target trajectory 136 is set so that these y-coordinates should coincide with each other. Further, in the case where the branch point is a branch point other than a perpendicular crossroads, the transitory target trajectory 136 is set also.

<Setting of Interim Target Trajectory with Turn>
(1) Minimum Turning Radius and Maximum Turning Radius of Vehicle Body In steps 345, 360, 380, and 455 mentioned above, an interim target trajectory with a turn is set. In these steps, it is preferable that the interim target trajectory is such a trajectory that at least one of a magnitude of a turning lateral acceleration of a vehicle and a magnitude of a rate of change in the same is minimized, among trajectories that pass through a travelable range.

Further, as known well, when a vehicle turns, an inner wheel difference and an outer wheel difference of a turning radius occur. An inner wheel difference and an outer wheel difference of a turning radius increase as a turning radius of a vehicle is smaller, as is the case where a vehicle turns at a crossing or the like. An interim target trajectory with a turn, therefore, has to be set with an inner wheel difference and an outer wheel difference taken into consideration.

Figure 39:
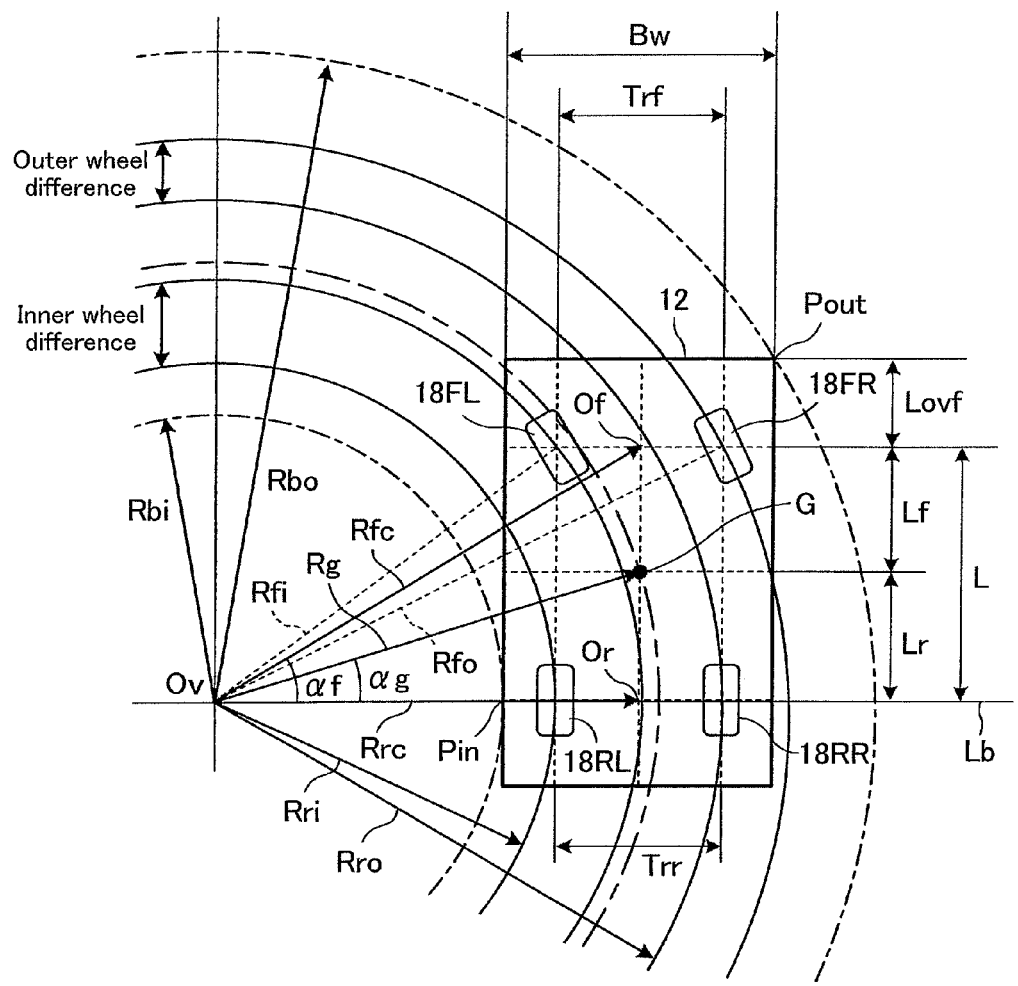
FIG. 39 explains how a minimum turning radius Rbi of a vehicle body and a maximum turning radius Rbo of the vehicle body are obtained based on a radius R of a target trajectory of a center of gravity G of the vehicle.

As illustrated in FIG. 39, the distances form the center of gravity G of the vehicle 12 to the front wheel axle and the rear wheel axle thereof are given as Lf and Lr, respectively, and the wheel base of the vehicle is given as L (=Lf+Lr). Further, the treads of the front wheels and the rear wheels are given as Trf and Trr, respectively, the width of the vehicle body is given as BW, and the front overhang length of the vehicle body is given as Lovf. Still further, the radius Rfo of a trajectory drawn by the tread center of a tire of the outer turning front wheel when the vehicle turns in a state where the steering wheel 20 is turned to the maximum degree is defined to be a minimum turning radius Rmin.

Further, as illustrated in FIG. 39, a straight line passing through the center Or of the rear wheel axle and the turning center Ov of the vehicle 12 is assumed to be the reference line Lb. An angle formed by the straight line Lg passing through the center of gravity G and the turning center Ov of the vehicle 12 with respect to the reference line Lb is given as $\alpha$g. The turning radius Rg of the center of gravity G of the vehicle 12 is represented by the expression 1 below.

$$Rg = Lr/\sin \alpha g \quad (1)$$

Further, an angle formed by a straight line passing through the center Of of the front wheel axle and the turning center Ov of the vehicle 12 with respect to the reference line Lb is given as $\alpha$f. Then, the turning radius Rfc of the center Of of the front wheel axle and the turning radius Rrc of the center Or of the rear wheel axle are represented by the expressions 2 and 3 below, respectively.

$$Rfc = L/\sin \alpha f \quad (2)$$

$$Rrc = L/\tan \alpha f \quad (3)$$

The turning radius Rfo of the outer turning front wheel and the turning radius Rfi of the turning-inner-side front wheel are represented by the expressions 4 and 5 below, respectively. The turning radius Rro of the turning-outer-side rear wheel and the turning radius Rri of the turning-inner-side rear wheel are represented by the expressions 6 and 7 below, respectively.

$$Rfo = Rfc + Trf/2 * \cos \alpha f \quad (4)$$

$$Rfi = Rfc - Trf/2 * \cos \alpha f \quad (5)$$

$$Rro = Rrc + Trr/2 \quad (6)$$

$$Rri = Rrc - Trr/2 \quad (7)$$

Among parts of the vehicle body of the vehicle 12, the part having the minimum turning radius is a point Pin at which the reference line Lb and the outline of the vehicle body intersect.

The minimum turning radius Rbi of the vehicle body, that is, the radius of the turning trajectory drawn by the point Pin is represented by the expression 8 below.

$$Rbi = Rrc - BW/2 \quad (8)$$

Further, among parts of the vehicle body of the vehicle 12, the part having the maximum turning radius is a point Pout at a turning-outer-side front corner of the vehicle body. A distance Lout between the point Pout and the center Of of the front wheel axle is represented by the expression 9 below. Therefore, the maximum turning radius Rbo of the vehicle body, that is, the radius of the turning trajectory drawn by the point Pout, substantially has a value obtained by the expression 10 below.

$$Lout = \{(BW/2)^2 + Lof^2\}^{1/2} \quad (9)$$

$$Rbo = Rfc + Lout \quad (10)$$

Further, as the expression 11 below is established from the relationship of distances among the center of gravity G of the vehicle 12, the center Of of the front wheel axle, the center Or of the rear wheel axle, the turning center Ov of the vehicle 12, the angle αg is represented by the expression 12 below.

$$\tan\alpha g = Lr/Rrc \quad (11)$$
$$= Lr/(L/\tan\alpha f)$$
$$= (Lr/L) * \tan\alpha f$$

$$\alpha f = \tan^{-1}\{\tan\alpha g/(Lr/L)\} \quad (12)$$

According to the above-described expressions 3 and 8, the minimum turning radius Rbi of the vehicle body is represented by the expression 13 below, and according to the above-described expressions 2 and 10, the maximum turning radius Rbo of the vehicle body is represented by the expression 14 below. The angle αg, however, is represented by the expression 15 below.

$$Rbi = Rrc - BW/2 \quad (13)$$
$$= L/\tan\alpha f - BW/2$$
$$= L/\tan[\tan^{-1}\{\tan\alpha g/(Lr/L)\}] - BW/2$$
$$= L/\tan\alpha g/(Lr/L) - BW/2$$
$$= (L^2/Lr)\tan\alpha g - BW/2$$

$$Rbo = Rfc + Lout \quad (14)$$
$$= L/\sin\alpha f + \{(BW/2)^2 + Lof^2\}^{1/2}$$
$$= L/[\sin\{\tan^{-1}(\tan\alpha g/(Lr/L))\}] +$$
$$\{(BW/2)^2 + Lof^2\}^{1/2}$$
$$= L/[\sin\{\tan^{-1}(\tan\alpha g/(Lr/L))\}] +$$
$$\{(BW/2)^2 + Rfc^2\}^{1/2}$$

$$\alpha g = \sin^{-1}(Lr/Rg) \quad (15)$$

As is clear from the above description, when the turning radius Rg of the center of gravity G of the vehicle 12 is determined, in other words, when the radius R of the target trajectory at the center of gravity G is determined, the minimum turning radius Rbi of the vehicle body and the maximum turning radius Rbo of the vehicle body can be obtained according to the above-described expressions 13 and 14.

(2) Setting of Interim Target Trajectory with Turning Radius of Vehicle Body Taken into Consideration A particular area 110 is divided into a plurality of sections, and an interim target trajectory is set to be a line that connect midpoints between a turning-inner-side boundary line and turning-outer-side boundary line of a travelable range of each section and that has a bending part in a circular arc form. In this case, the interim target trajectory in each section is preferably set using the clothoid curve so as to reduce increase/decrease of the rudder angle of the front wheels, thereby ensuring excellent riding comfort of the vehicle.

Next, as to the interim target trajectories of respective sections, a radius R at each position is obtained, and the minimum turning radius Rbi of the vehicle body and the maximum turning radius Rbo of the vehicle body are obtained according to the above-described expressions 13 and 14, whereby the minimum turning trajectory and the maximum turning trajectory of the vehicle body are obtained regarding each section. Then, in the case where the minimum turning trajectory or the maximum turning trajectory of the vehicle body is not within travelable range, the interim target trajectory is modified so that the minimum turning trajectory and maximum turning trajectory fall within the travelable range.

Figure 40:
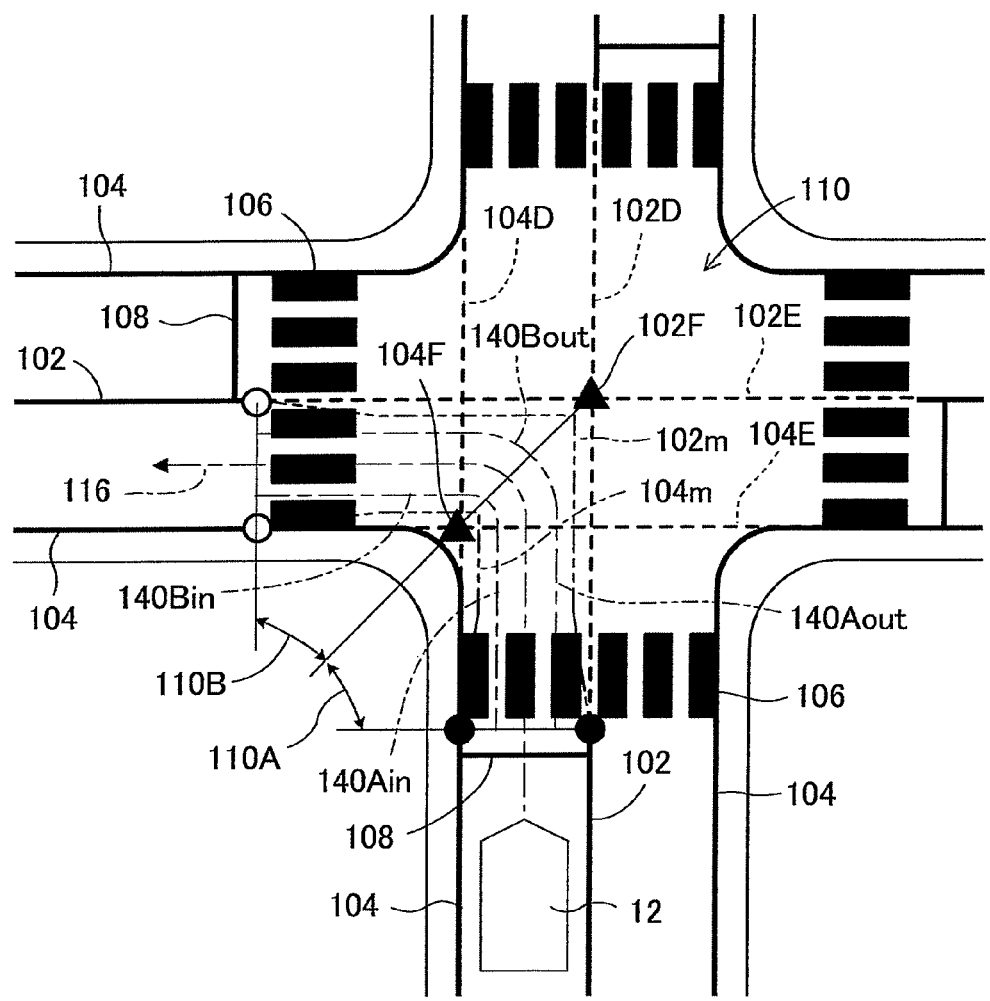
FIG. 40 explains how a particular area is divided into two sections and how a minimum turning trajectory and a maximum turning trajectory of a vehicle body are obtained, regarding a case where the vehicle turns to the left at a perpendicular crossroads.

For example, FIG. 40 explains how a particular area 110 is divided into two sections and how a minimum turning trajectory and a maximum turning trajectory of a vehicle body are obtained, regarding a case where the vehicle turns to the left at a perpendicular crossroads. In FIG. 40, the particular area 110 is divided into a first section 110A and a next section 110B, with a boundary at a corner of a crossroads. "140Ain" and "140Aout" indicate a minimum turning trajectory and a maximum turning trajectory of a vehicle body regarding the first section 110A, respectively. "140Bin" and "140Bout" indicate a minimum turning trajectory and a maximum turning trajectory of the vehicle body regarding the next section 110B, respectively.

Figure 41:
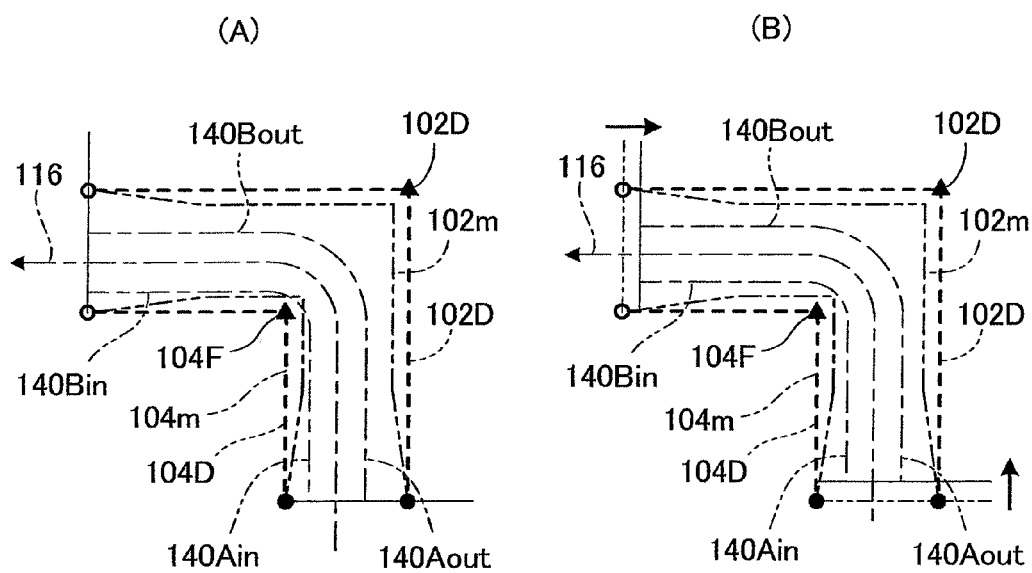
FIG. 41 explains how an interim target trajectory is set anew with a turning radius of a vehicle body being taken into consideration, regarding a case where a minimum turning trajectory of the vehicle body is not within a travelable range.

FIG. 41(A) illustrates, as an example, a case where the minimum turning trajectory of the vehicle body is not within the travelable range. In this case, as illustrated in FIG. 41(B), the start point of the interim target trajectory in the first section 110A and the end point of the interim target trajectory of the next section 110B are moved to positions closer to the center of the crossroads, and thereafter, the setting of an interim target trajectory is executed again, with the above-mentioned turning radius of the vehicle body taken into consideration.

Further, FIG. 42(A) illustrates a case where the minimum turning trajectory of the vehicle body is not moved into the travelable range even though the start point and the end point of the interim target trajectories are moved to positions closer to the center of the crossing. In this case, as illustrated in FIG. 42(B), the start point of the interim target trajectory of the first section 110A and the end point of the interim target trajectory of the next section 110B are moved to positions on the turning-outer-side, and thereafter, the setting of an interim target trajectory is executed again, with the above-mentioned turning radius of the vehicle body taken into consideration.

Figure 42:
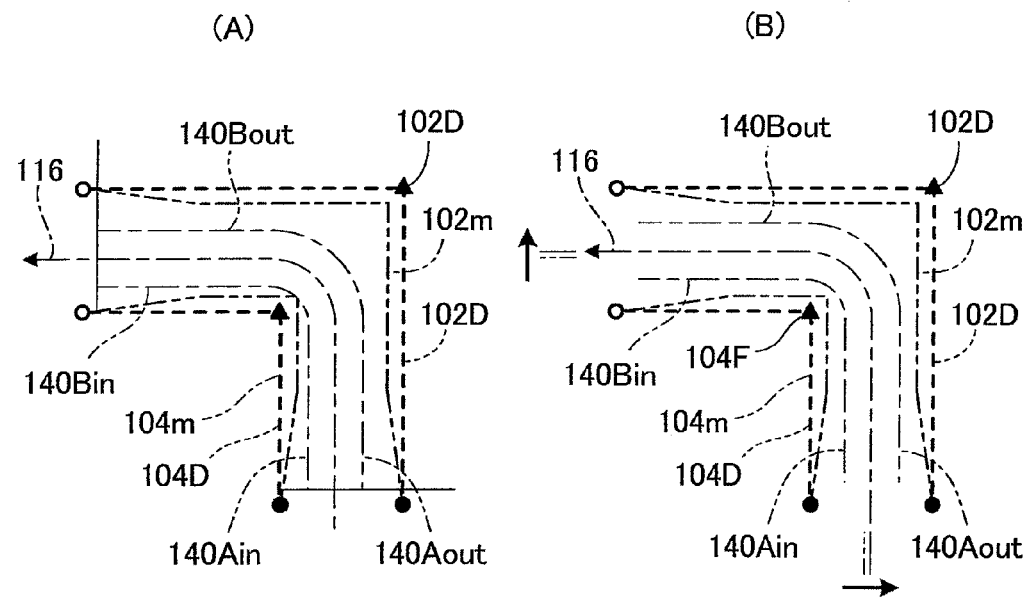
FIG. 42 explains how an interim target trajectory is set anew with a turning radius of a vehicle body being taken into consideration, regarding a case where a minimum turning trajectory of the vehicle body is not within a travelable range even after an interim target trajectory is set anew.

In the case where the minimum turning trajectory of the vehicle body is not moved into the travelable range even with the processing illustrated in FIG. 42, the interim target trajectory is set to be a circular trajectory, or the particular area 110 is divided into three or more sections, so that the minimum turning trajectory of the vehicle body moves into the travelable range.

Though not illustrated in the drawings, the start point of the interim target trajectory of the first section 110A and the end point of the interim target trajectory of the next section 110B are moved to positions farther from the center of the crossroads, in the case where the maximum turning trajectory of the vehicle body is not within the travelable range. In the case where even this movement does not cause the maximum turning trajectory of the vehicle body to move into the travelable range, the start point and the end point are moved to positions on the turning-inner-side.

<Estimation of Current Location of One's Own Vehicle>

Next, the following describes "estimation of a current location of one's own vehicle" executed in the above-described step 910. It should be noted that, as normal trajectory control is carried out in a state in which a current location of one's own vehicle is recognized, the estimation of the current location of the vehicle is carried out in interim trajectory control and transitory trajectory control.

If a rudder angle of the front wheels (value obtained by dividing a steering angle θ by an overall steering gear ratio) is given as δ, then, a yaw rate γ and a slip angle β of the vehicle are represented by the expressions 16 and 17 below, respectively. Though the vehicle speed V has a value detected by the vehicle speed sensor 70, the same may be obtained as an average value of wheel speeds of four wheels. Alternatively, the yaw rate γ may be a value detected by the yaw rate sensor 74.

$$\gamma = V/L * \delta \quad (16)$$

$$\beta = Lr/L * \delta \quad (17)$$

The rates of changes dX/dt and dY/dt of the x-coordinate and the y-coordinate of the center of gravity G of the vehicle are represented by the expressions 18 and 19 below, respectively. Therefore, the current location of the vehicle, that is, the coordinates (X, Y) of the center of gravity G, can be estimated as values represented by the expressions 20 and 21 below. The yaw angle φ (see FIG. 43) is represented by the expression 22 below.

$$dX/dt = V \cos(\beta + \phi) \quad (18)$$

$$dY/dt = V \sin(\beta + \phi) \quad (19)$$

[Formula 1]

$$X = V \int_0^t \cos(\beta + \phi) dt \quad (20)$$

$$Y = V \int_0^t \sin(\beta + \phi) dt \quad (21)$$

$$\phi = \int_0^t \gamma dt \quad (22)$$

It should be noted that in the case where the position of the center of gravity G of the vehicle is not the origin of coordinates upon the start of control, the coordinates of the center of gravity G of the vehicle upon the start of control are given as (X0, Y0), and the yaw angle of the vehicle is given as φ0. Then, the current location of the vehicle, that is, the coordinates (X, Y) of the center of gravity G, are represented by the expressions 23 and 24 below, and the yaw angle φ of the vehicle is represented by the expression 25 below.

[Formula 2]

$$X = X0 + V \int_0^t \cos(\beta + \phi) dt \quad (23)$$

$$Y = Y0 + V \int_0^t \sin(\beta + \phi) dt \quad (24)$$

$$\phi = \phi 0 + \int_0^t \gamma dt \quad (25)$$

<Interim or Transitory Trajectory Control>

(1) Estimation of Radius R of Target Trajectory, etc.

Figure 43:
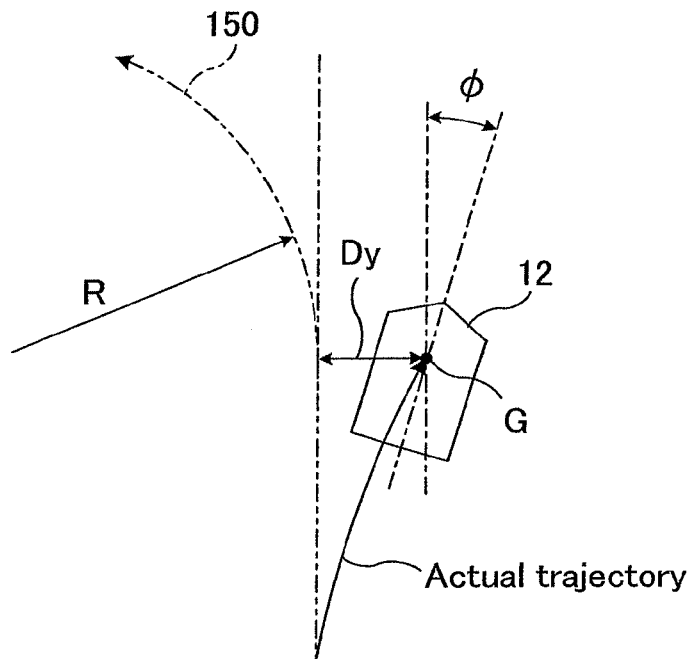
FIG. 43 explains a radius R of a target trajectory, a lateral deviation Dy of a center of gravity of the vehicle with respect to the target trajectory, and a yaw angle $\phi$ of the vehicle with respect to the target trajectory.

First, as illustrated in FIG. 43, a target trajectory 150 at the center of gravity G of the vehicle 12, that is, a radius R of an interim target trajectory or a transitory target trajectory is estimated. Further, a lateral deviation Dy of the center of gravity G of the vehicle 12 with respect to the target trajectory 150 is estimated, while a yaw angle φ of the vehicle 12 with respect to the target trajectory 150 is estimated.

(2) Calculation of Target Lateral Acceleration Gyt of Vehicle

First, a target yaw angle ψt of the vehicle is calculated, as an infinitesimal value that has the same sign as that of the radius R of the target trajectory and that is greater as the magnitude of the radius R is greater. Then, using a gain for which Kr, Ky, and Kp are preliminarily set, a target lateral acceleration Gyt of the vehicle for causing the vehicle to travel along the target trajectory is calculated according to the expression 26 below. It should be noted that Dyt represents a target value of the lateral deviation Dy, and may be 0.

$$Gyt = Kr \times R + Ky(Dyt - Dy) + Kp(\psi t - \psi) \quad (26)$$

Figure 44:
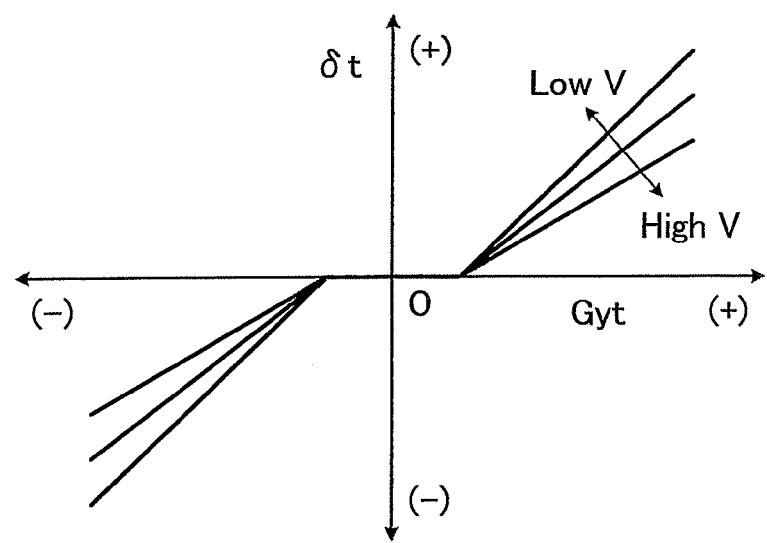
FIG. 44 illustrates a map for calculation of a target rudder angle $\delta t$ of left and right front wheels for interim or transitory trajectory control, based on a target lateral acceleration Gyt of the vehicle and a vehicle speed V.

(3) Calculation of Target Rudder Angle δt and Control of Rudder Angle of Front Wheels A target rudder angle δt of the left and right front wheels for interim or transitory trajectory control is calculated based on a target lateral acceleration Gyt of the vehicle and a vehicle speed V, with reference to the map illustrated in FIG. 44. Then, a target angle θpt of the pinion 36 corresponding to the target rudder angle δt is calculated, and the rudder angle varying device 30 is controlled so that the angle of the pinion 36 coincides with the target angle θpt, whereby the rudder angle of the front wheel is controlled so as to coincide with the target rudder angle δt. In this case, the rudder angle of the front wheels is controlled by at least one of feedback control and feedforward control based on the target rudder angle δt.

<Driver Cooperative Control>

Next, the following describes "target trajectory modification control" and "branch point task changing control", which are executed in step 950 mentioned above as driver cooperative control.

(1) "Target Trajectory Modification Control"

For example, a steering angle θ at the start of interim trajectory control is assumed to be a reference steering angle θ0, and a difference between the steering angle θ during interim trajectory control and reference steering angle θ0 is calculated as an amount Δθ of a driver's steering operation. Then, it is determined whether a situation in which the absolute value of the steering operation amount Δθ is greater than a first reference value Δθ1 and smaller than a second reference value Δθ2 has continued for a reference time Td1 or more. When the result of the determination is negative, the interim target trajectory is not modified, but when the result of the determination is affirmative, the interim target trajectory is modified toward such a side that the driver's steering operation is reflected. It should be noted that the reference values Δθ1 and Δθ2 are positive values, and the reference value Δθ2 is greater than the reference value Δθ1. Besides, the reference time Td1 has a positive value, too.

Figure 45:
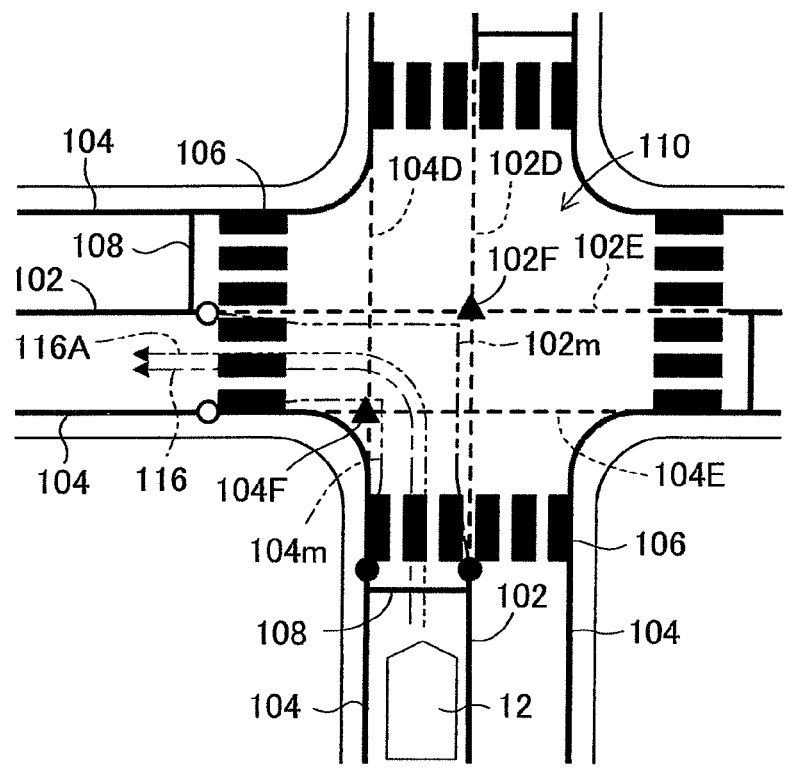
FIG. 45 explains modification of an interim target trajectory in the case where the interim target trajectory is a trajectory for turning to the left at a perpendicular crossroads and a steering angle in the direction for turning to the left is reduced by a driver.

For example, FIG. 45 explains modification of an interim target trajectory in the case where the interim target trajectory is a trajectory for turning to the left at a perpendicular crossroads and a steering angle in the direction for turning to the left is reduced by a driver. In FIG. 45, "116" indicates an original interim target trajectory, and "116A" indicates a modified interim target trajectory. As is clear from comparison between the two interim target trajectories, the interim target trajectory is modified toward such a side that the driver's steering operation is reflected.

However, in the case where the vehicle is determined to be unable to travel along a modified interim target trajectory for such a reason that traveling along the modified interim target trajectory causes the vehicle to come into contact with an obstacle, the modification of the interim target trajectory is not carried out and interim trajectory control is stopped.

(2) "Branch Point Task Changing Control"

It is determined, for example, whether a situation in which the absolute value of the steering operation amount $\Delta\theta$ is greater than a third reference value $\Delta\theta3$ and smaller than a fourth reference value $\Delta\theta4$ has continued for a reference time Td2 or more. When the result of the determination is negative, the task at the branch point is not changed, but when the result of the determination is affirmative, the task at the branch point is changed to such a task that the driver's steering operation is reflected. It should be noted that the reference values $\Delta\theta3$ and $\Delta\theta4$ are positive values equal to or greater than the reference value $\Delta\theta2$, and the reference value $\Delta\theta4$ is greater than the reference value $\Delta\theta3$. Besides, the reference time Td2 has a positive value, too.

Figure 46:
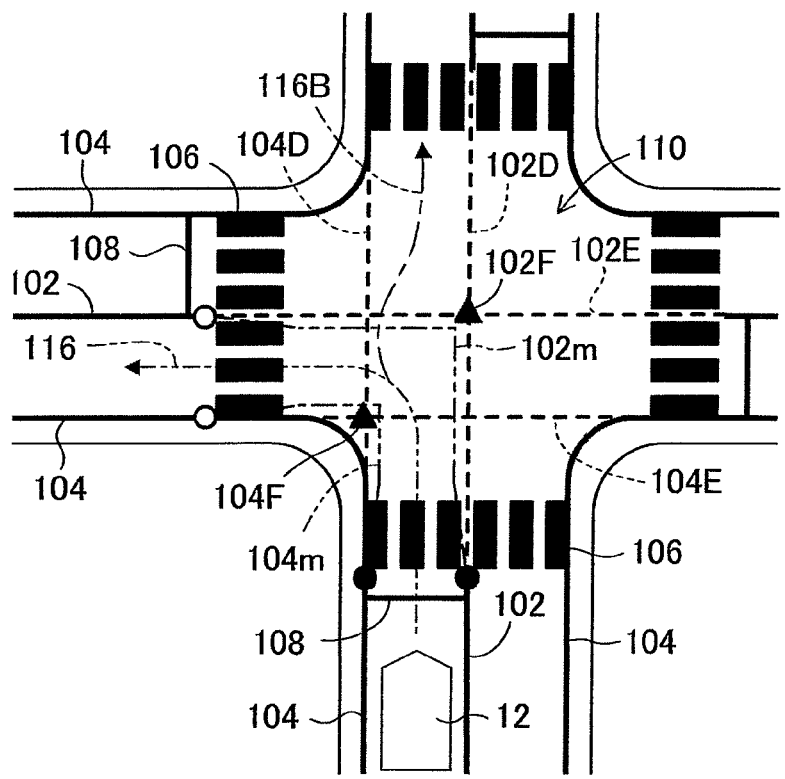
FIG. 46 explains task change at a branch point in the case where a task at a branch point is turning to the left at a perpendicular crossroads and a steering angle $\theta$ is changed by a driver so as to approach 0.

FIG. 46 explains task change at a branch point in the case where a task at a branch point is turning to the left at a perpendicular crossroads and a steering angle $\theta$ is changed by a driver so that the vehicle goes straight. In FIG. 46, "116" indicates an original interim target trajectory, and "116B" indicates an interim target trajectory that is modified so that the task at the branch point becomes going straight. As is clear from comparison between the two interim target trajectories, the interim target trajectory is modified toward such a side that the task that the driver wishes for can be achieved.

However, in this case also, in the case where the vehicle is determined to be unable to travel along a modified interim target trajectory for such a reason that traveling along the modified interim target trajectory causes the vehicle to go over the set margin, the modification of the interim target trajectory is not carried out and interim trajectory control is stopped.

Further, in the case where the interim target trajectory is a trajectory for going straight, right turn, or U-turn, when the steering angle is changed by the driver to the direction for turning to the left, the interim target trajectory is changed to an interim target trajectory for left turn, going straight, or right turn, respectively. Still further, in the case where the interim target trajectory is a trajectory for left turn, going straight, or right turn, when the steering angle is changed by the driver to the direction for turning to the right, the interim target trajectory is changed to an interim target trajectory for going straight, right turn, or U-turn, respectively.

Operation of First Embodiment

Next, the following describes operations of First Embodiment configured as described above, regarding various driving situations of a vehicle.

(1) When Vehicle is Traveling Road Having No Branch Point

In this case, as interim trajectory control is unnecessary, normal trajectory control is executed so that a vehicle travels along a normal target trajectory. More specifically, the result of the determination is affirmative in steps 10 and 30, and a normal target trajectory is set in step 70. Further, the result of the determination is negative in steps 90, 130 and 150, the flags Fnp and Fpn are reset to 0 in step 170, and normal trajectory control is executed in step 190 so that the vehicle travels along the normal target trajectory.

(2) When Vehicle is Coming Close to Branch Point (2-1) When Permission Switch 78 is ON In this case, transitory trajectory control for transition from normal trajectory control to interim trajectory control is executed. More specifically, the result of the determination is affirmative in steps 10 and 30, a normal target trajectory is set in step 70. Further, the result of the determination is negative in steps 90 and 130, but the result of the determination is affirmative in step 150, and the flag Fnp is set to 1 while the flag Fpn is reset to 0 in step 160. Then, the result of the determination is affirmative in step 210, but the result of the determination is negative in step 250.

When the navigation device 80 is in operation and interim trajectory control based on navigation information can be executed, the result of the determination is affirmative in steps 270 and 290. In step 300, therefore, an interim target trajectory based on navigation information is set according to the flowchart illustrated in FIG. 4.

In contrast, when navigation device 80 is not in operation, the result of the determination is negative in step 270. Further, when the navigation device 80 is in operation but interim trajectory control based on navigation information cannot be executed, the result of the determination is affirmative in step 270, but the result of the determination is negative in step 290. In these cases, therefore, an interim target trajectory is set based on picked-up image information obtained by the CCD camera 68 in step 400, according to the flowchart illustrated in FIG. 5.

Further, since the flag Fnp is set to 1, the result of the determination is affirmative in step 510, and a transitory target trajectory for transition from normal trajectory control to interim trajectory control is set in step 600, according to the flowchart illustrated in FIG. 6. Then, the current location of the vehicle is estimated in step 910, and transitory trajectory control is executed in step 930 so that the vehicle travels along the transitory target trajectory.

(2-2) When Permission Switch 78 is OFF

In this case, transitory trajectory control for transition from normal trajectory control to interim trajectory control is not executed. More specifically, the result of the determination is affirmative in steps 10 and 30, a normal target trajectory is set in step 70. Further, the result of the determination is negative in steps 90 and 130, the result of the determination is affirmative in step 150, and the flag Fnp is set to 1 while the flag Fpn is reset to 0 in step 160. Then, the result of the determination is negative in step 210, but since the flag Fnp is 1, normal trajectory control in step 190 is continued, without execution of transitory trajectory control, until immediately before the vehicle starts traveling a branch point.

(3) When Vehicle is Traveling Particular Area (3-1) When Permission Switch 78 is ON In this case, since it is after the transition from normal trajectory control to interim trajectory control is completed, interim trajectory control is executed. More specifically, the result of the determination is affirmative in step 10, but the result of the determination is negative in step 30, and then, the flags Fnp and Fpn are reset to 0 in step 50.

Then, the result of the determination is affirmative in steps 210 and 250, and the result of the determination is negative in steps 510 and 710. Then, the current location of the vehicle is estimated in step 910, and interim trajectory control is executed in step 930 so that the vehicle travels along the interim target trajectory.

(3-2) When Permission Switch 78 is OFF

In this case, interim trajectory control is not executed. More specifically, as is in the case (3-1), the result of the determination is affirmative in step 10, but the result of the determination is negative in step 30, and then, the flags Fnp and Fpn are reset to 0 in step 50.

Since the permission switch 78 is OFF, however, the result of the determination is negative in step 210. Then, since the flag Fnp is 0 and trajectory control is stopped in step 230 and the state is maintained, neither interim trajectory control nor normal trajectory control is executed while the vehicle is traveling a particular area.

(4) When Vehicle Ends Traveling Particular Area (4-1) When Permission Switch 78 is ON In this case, since transition from interim trajectory control to normal trajectory control is necessary, transitory trajectory control for transition from interim trajectory control to normal trajectory control is executed. More specifically, the result of the determination is affirmative in steps 10 and 30, and a normal target trajectory is set in step 70. Further, the result of the determination is affirmative in step 90, and the flag Fnp is reset to 0 while the flag Fpn is set to 1 in step 110.

Further, the result of the determination is affirmative in steps 210 and 250, and the result of the determination is negative in step 510, but the result of the determination is affirmative in step 710. In step 800, therefore, a transitory target trajectory for transition from interim trajectory control to normal trajectory control is set, according to the flowchart illustrated in FIG. 7.

When the transitory target trajectory is set, then, the result of the determination is negative in step 90, while the result of the determination is affirmative in step 130. Then, the current location of the vehicle is estimated in step 910, and transitory trajectory control is executed in step 930 so that the vehicle travels along the transitory target trajectory.

It should be noted that when transitory trajectory control is finished, in other words, when the traveling along the transitory target trajectory is finished, the result of the determination is negative in steps 90, 130 and 150. Therefore, the flags Fnp and Fpn are reset to 0 in step 170, and normal trajectory control is executed in step 190 so that the vehicle travels along the normal target trajectory.

(4-2) When Permission Switch 78 is OFF

In this case, since interim trajectory control is not executed, transitory trajectory control is not executed, either. When normal trajectory control becomes possible, therefore, control in the same manner as that in the above-described case (1). More specifically, the result of the determination is affirmative in steps 10 and 30, and a normal target trajectory is set in step 70. Further, the result of the determination is negative in steps 90, 130 and 150, the flags Fnp and Fpn are reset to 0 in step 170, and normal trajectory control is executed in step 190 so that the vehicle travels along the normal target trajectory.

Second Embodiment

Figure 8:
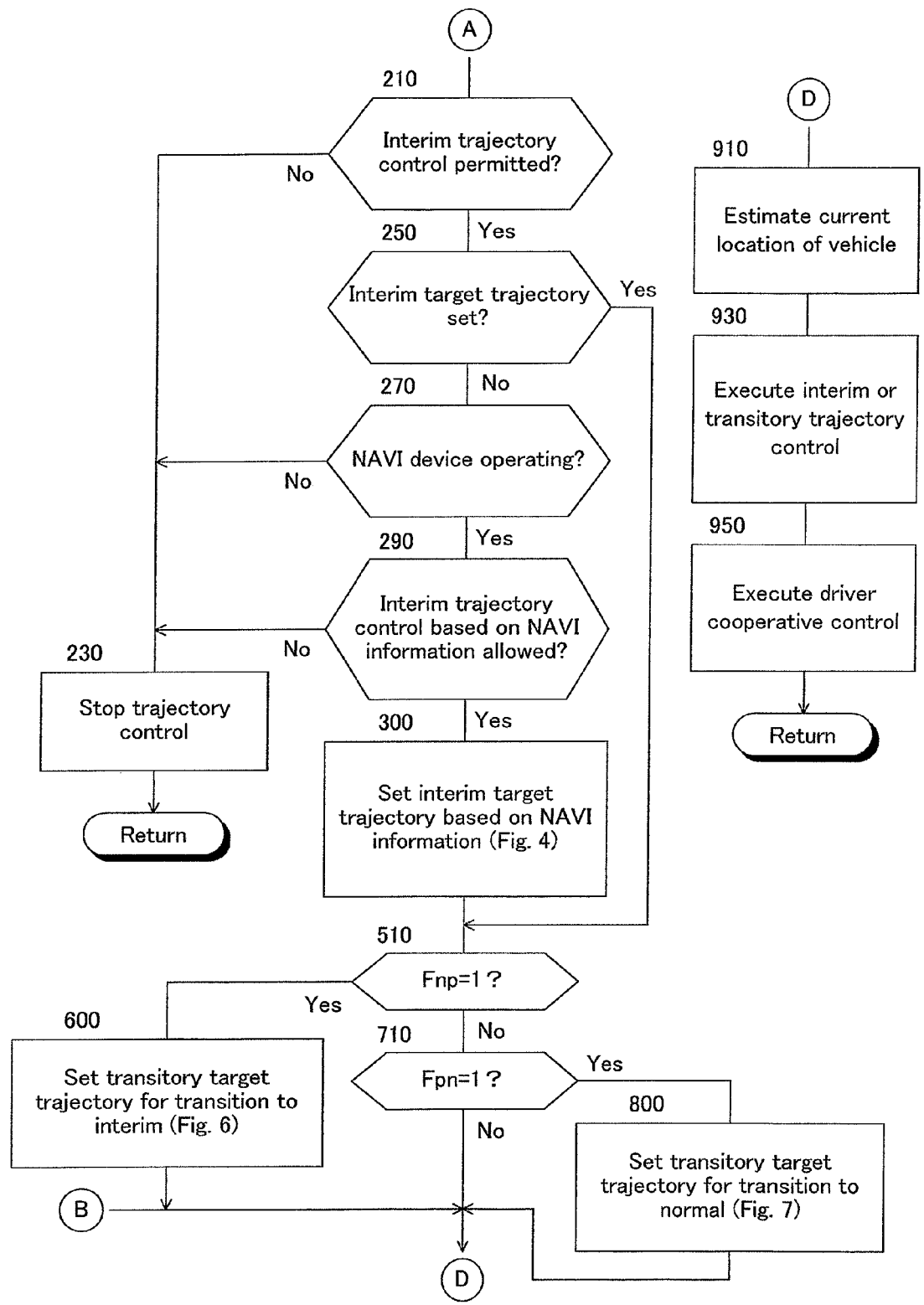
FIG. 8 is a general flowchart illustrating a last half of a traveling trajectory control routine in Second Embodiment of a vehicle cruise control device according to the present invention that is applied in a navigation device installed vehicle and that is configured so that interim trajectory control based on picked-up image information is not executed.

FIG. 8 is a general flowchart illustrating a last half of a traveling trajectory control routine in Second Embodiment of a vehicle cruise control device according to the present invention that is applied in a navigation device installed vehicle and that is configured so that interim trajectory control based on picked-up image information is not executed. In FIG. 8, to steps identical to the steps illustrated in FIG. 3, the step numbers identical to those in FIG. 3 are assigned. The same is the case with FIG. 9 referred to below.

As is clear from comparison between FIG. 8 and FIG. 3, in this Second Embodiment, step 400 is not executed, and when the result of the determination is negative in step 270 or 290, the control proceeds to step 230. More specifically, trajectory control is ended, without execution of interim trajectory control based on picked-up image information, and the control returns to step 10. When the flag Fnp is 1, however, the control proceeds to step 190 until the flag Fnp becomes 0, and normal trajectory control is continued.

The other steps in Second Embodiment are identical to those in First Embodiment mentioned above. Second Embodiment, therefore, operates in the same manner as that in First Embodiment mentioned above, except for the above-described cases (2-1) and (3-1), that is, "(2-1) When permission switch 78 is ON" and "(3-1) When permission switch 78 is ON".

In Second Embodiment, when the navigation device 80 is not in operation, the result of the determination is negative in step 270. Further, when the navigation device 80 is in operation but interim trajectory control based on navigation information cannot be executed, the result of the determination is affirmative in step 270, but the result of the determination is negative in step 290. In these cases, therefore, step 400 is not executed, and an interim target trajectory based on picked-up image information obtained by the CCD camera 68 is not set.

According to Second Embodiment, therefore, working effects identical to those in First Embodiment mentioned above can be achieved, except for the point that interim trajectory control is not executed, in the case where the navigation device 80 is not in operation or in the case where interim trajectory control based on navigation information cannot be executed.

Third Embodiment

Figure 9:
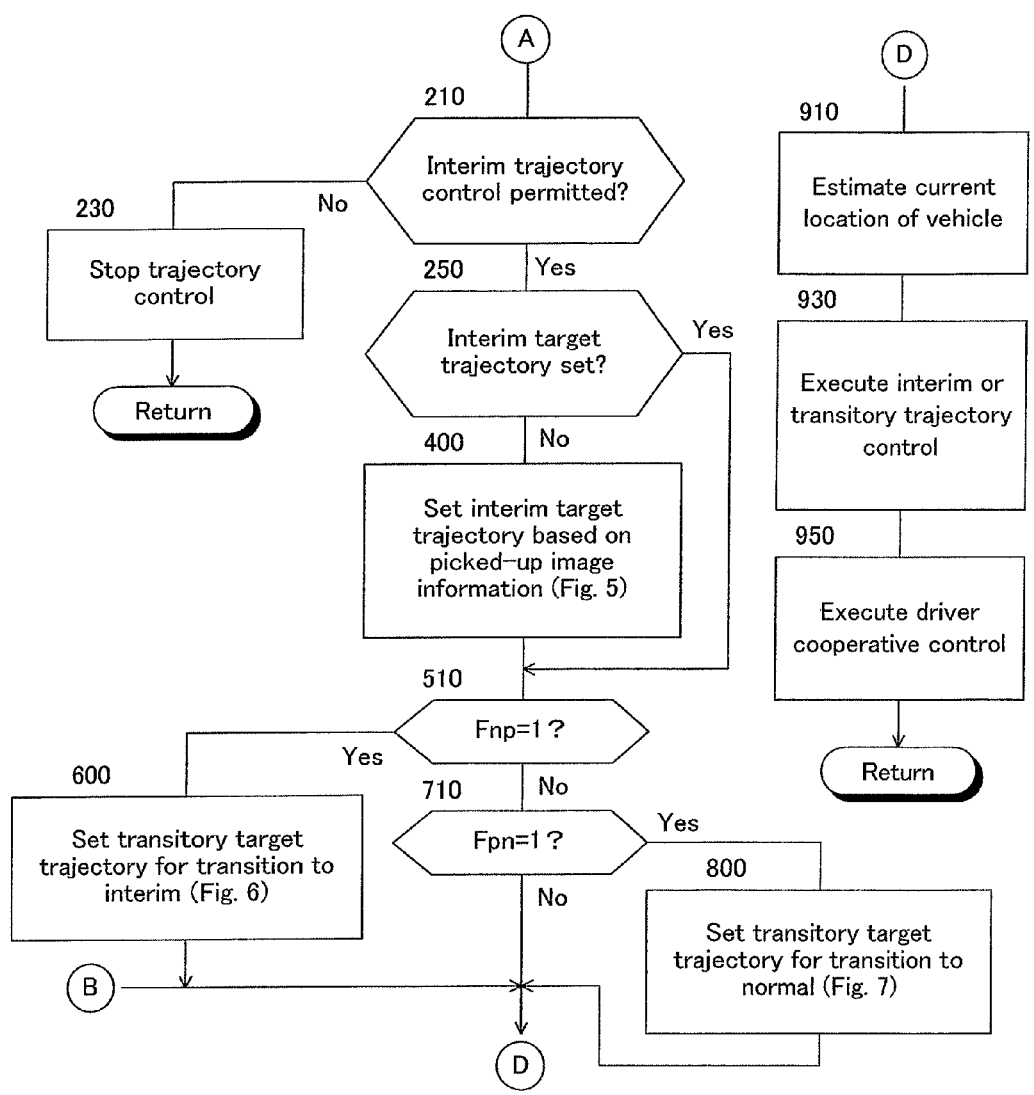
FIG. 9 is a general flowchart illustrating a last half of a traveling trajectory control routine in Third Embodiment of a vehicle cruise control device according to the present invention that is applied in a vehicle in which a navigation device is not installed and that is configured as a traveling trajectory control device.

FIG. 9 is a general flowchart illustrating a last half of a traveling trajectory control routine in Third Embodiment of a vehicle cruise control device according to the present invention that is applied in a vehicle in which a navigation device is not installed and that is configured as a traveling trajectory control device.

In this Third Embodiment, steps 270, 290, and 300 are not executed, and when the result of the determination is negative in step 250, that is, when it is determined that an interim target trajectory has not been set yet, the control proceeds to step 400. Therefore, according to the flowchart illustrated in FIG. 5, an interim target trajectory is set based on forward image information of the vehicle 12 acquired by the CCD camera 68.

The other steps in Third Embodiment are identical to those in First Embodiment mentioned above. Third Embodiment, therefore, operates in the same manner as that in First Embodiment mentioned above, except for the point that an interim target trajectory based on navigation information is not set.

In Second Embodiment, in the case where an interim target trajectory has not been set yet, the result of the determination is negative in step 250. Thereby, step 400 is executed, and an interim target trajectory is set based on picked-up image information obtained by the CCD camera 68.

According to Third Embodiment, therefore, working effects identical to those in First Embodiment mentioned above can be achieved, except for the point that interim trajectory control based on navigation information is not executed.

The foregoing describes the present invention in detail, regarding particular embodiments, but the present invention is not limited to the embodiments mentioned above. It should be evident to persons skilled in the art that the present invention can be embodied variously within the scope of the present invention.

For example, in each embodiment mentioned above, a target trajectory for a vehicle is a line, but the target trajectory may be set to be a target traveling range having a width in which a vehicle can travel, and a vehicle may be controlled so as to travel in the range.

Further, according to the descriptions of the embodiments mentioned above, no traveling route specification target exists in a particular area, but a branch point may include a priority road, and a partial traveling route specification target such as a white line indicating the priority road may exist therein. In this case, the partial traveling route specification target may be used as an interim traveling route specification target for setting an interim target trajectory.

Further, in each embodiment mentioned above, before a vehicle enters a particular area, traveling trajectory control is caused to make gradual transition from normal trajectory control to interim trajectory control, and further, after the vehicle finishes the traveling in the particular area, traveling trajectory control is caused to make gradual transition from interim trajectory control to normal trajectory control. At least either one of these transitions, however, may be executed in the particular area, or further alternatively, at least either one of these transitions may be executed both in the particular area and in an area outside the particular area.

Further, in each embodiment mentioned above, a normal target trajectory is calculated when transition is made from interim trajectory control to normal trajectory control. This configuration, however, may be modified as follows: when a vehicle travels for a predetermined distance or for a predetermined time in a situation in which interim trajectory control is being executed, a normal target trajectory is calculated at a stage where it is determined that transition from interim trajectory control to normal trajectory control is needed.

Further, in each embodiment mentioned above, a target rudder angle of steered wheels for causing a trajectory of a vehicle to coincide with a target trajectory is calculated as a target rudder angle for feedforward control. A target rudder angle of steered wheels, however, may be calculated as a target rudder angle for feedback control, or alternatively, may be calculated as a final target rudder angle based on a target rudder angle for feedback control and a target rudder angle for feedforward control.

Further, in each embodiment mentioned above, control for causing a trajectory of a vehicle to coincide with a target trajectory is control of a rudder angle of steered wheels. Control for causing a trajectory of a vehicle to coincide with a target trajectory, however, may be control of a difference between driving/braking forces of left and right wheels, or alternatively, may be combination of control of a rudder angle of steered wheels and control of a difference between driving/braking forces of left and right wheels.

The invention claimed is:

1. A vehicle cruise control device comprising:
    an image pickup device configured to acquire at least information about a situation in front of the vehicle; and
    a control unit configured to obtain a target trajectory of the vehicle based on a traveling route specification target included in the information acquired by the image pickup device, and perform traveling trajectory control so as to cause the vehicle to travel along the target trajectory,
    when a target trajectory cannot be obtained based on the traveling route specification target, an area where a traveling route branches into a plurality of traveling routes is considered to be a particular area, and
    wherein, when the vehicle travels to the particular area, the control unit determines a first traveling route that the vehicle is to travel after traveling the particular area, obtains an interim target trajectory for the particular area based on a first traveling route specification target of the first traveling route and a second traveling route specification target of a second traveling route that the vehicle is traveling, and executes interim traveling trajectory control so that the vehicle travels along the interim target trajectory.

2. The vehicle cruise control device according to claim 1, wherein:
    when the first traveling route that the vehicle is to travel has been already selected from the plurality of traveling routes, the control unit sets a virtual traveling route specification target based on the second traveling route specification target of the second traveling route and the first traveling route specification target of the first traveling route determined by the selection, and obtains the interim target trajectory based on the virtual traveling route specification target.

3. The vehicle cruise control device according to claim 1, wherein:
    when the first traveling route that the vehicle is to travel has not been selected yet from the plurality of traveling routes, the control unit estimates the first traveling route that the vehicle is to travel from the plurality of traveling routes based on a driving situation of the vehicle and a driver's driving operation, sets a virtual traveling route specification target based on the second traveling route specification target of the second traveling route and the first traveling route specification target of the first traveling route determined by the estimation, and obtains the interim target trajectory based on the virtual traveling route specification target.

4. The vehicle cruise control device according to claim 2, wherein:
    the control unit determines a vehicle travelable range in the particular area based on the virtual traveling route specification target, and obtains the interim target trajectory based on a position of the vehicle under the execution of the traveling trajectory control and the travelable range.

5. The vehicle cruise control device according to claim 2, further comprising:
    a map information acquisition unit configured to acquire map information about the particular area and an area around thereof,
    wherein the control unit sets the virtual traveling route specification target based on the second traveling route specification target of the second traveling route and the first traveling route specification target of the first traveling route which are included in the map information acquired by the map information acquisition unit.

6. The vehicle cruise control device according to claim 4, wherein:
    when the vehicle has to turn in the particular area, the control unit estimates a minimum turning radius and a maximum turning radius of a body of the vehicle based on a radius of the interim target trajectory; and
    when the minimum turning radius or the maximum turning radius is not within the vehicle travelable range, the control unit sets an interim target trajectory anew so that the minimum turning radius and the maximum turning radius fall in the vehicle travelable range.

7. The vehicle cruise control device according to claim 4, wherein:
    the control unit uses, as the interim target trajectory, such a trajectory that at least one of a magnitude of a turning lateral acceleration of the vehicle and a magnitude of a rate of change in the turning lateral acceleration is minimized, among trajectories that pass through the vehicle travelable range.

8. The vehicle cruise control device according to claim 4, wherein:
the control unit modifies the interim target trajectory within the vehicle travelable range based on a driver's driving operation after start of the interim traveling trajectory control.

9. The vehicle cruise control device according to claim 2, wherein:
when a situation in which a magnitude of a difference between a steering angle indicating a driver's driving operation amount at start of the interim traveling trajectory control and a present steering angle is equal to or more than a reference value for target trajectory change continues for a period of time equal to or longer than a reference period of time for target trajectory change, the control unit changes the first traveling route that the vehicle is to travel to a third traveling route based on the driver's driving operation, and obtains an interim target trajectory anew based on the second traveling route specification target of the second traveling route and a third traveling route specification target of the third traveling route.

10. The vehicle cruise control device according to claim 2, wherein:
in the interim traveling trajectory control, the control unit calculates an interim target rudder angle of a steered wheel for causing a trajectory of the vehicle to coincide with the interim target trajectory by at least one of feedback control and feedforward control, and controls the rudder angle of the steered wheel based on the interim target rudder angle.

11. The vehicle cruise control device according to claim 2, wherein:
the control unit causes cruise control to make gradual transition from traveling trajectory control to interim traveling trajectory control before the vehicle enters the particular area.

12. The vehicle cruise control device according to claim 2, wherein:
the control unit causes cruise control to make gradual transition from interim traveling trajectory control to traveling trajectory control after the vehicle finishes traveling in the particular area.

13. The vehicle cruise control device according to claim 2, wherein:
the particular area is any one of a crossing, a T-intersection, and a branched road.

14. The vehicle cruise control device according to claim 3, wherein:
the control unit determines a vehicle travelable range in the particular area based on the virtual traveling route specification target, and obtains the interim target trajectory based on a position of the vehicle under the execution of the traveling trajectory control and the travelable range.

15. The vehicle cruise control device according to claim 3, further comprising:
a map information acquisition unit configured to acquire map information about the particular area,
wherein the control unit sets the virtual traveling route specification target based on the map information acquired by the map information acquisition unit.

16. The vehicle cruise control device according to claim 3, wherein:
when a situation in which a magnitude of a difference between a steering angle indicating a driver's driving operation amount at start of the interim traveling trajectory control and a present steering angle is equal to or more than a reference value for target trajectory change continues for a period of time equal to or longer than a reference period of time for target trajectory change, the control unit changes the first traveling route that the vehicle is to travel to a third traveling route based on the driver's driving operation, and obtains an interim target trajectory anew based on the second traveling route specification target of the second traveling route and a third traveling route specification target of the third traveling route.

17. The vehicle cruise control device according to claim 3, wherein:
in the interim traveling trajectory control, the control unit calculates an interim target rudder angle of a steered wheel for causing a trajectory of the vehicle to coincide with the interim target trajectory by at least one of feedback control and feedforward control, and controls the rudder angle of the steered wheel based on the interim target rudder angle.

18. The vehicle cruise control device according to claim 3, wherein:
the control unit causes cruise control to make gradual transition from traveling trajectory control to interim traveling trajectory control before the vehicle enters the particular area.

19. The vehicle cruise control device according to claim 3, wherein:
the control unit causes cruise control to make gradual transition from interim traveling trajectory control to traveling trajectory control after the vehicle finishes traveling in the particular area.

20. The vehicle cruise control device according to claim 3, wherein:
the particular area is any one of a crossing, a T-intersection, and a branched road.

* * * * *